United States Patent
Matsuno et al.

(10) Patent No.: US 9,199,650 B2
(45) Date of Patent: Dec. 1, 2015

(54) VEHICLE DRIVING FORCE CONTROL DEVICE

(75) Inventors: Koji Matsuno, Tokyo (JP); Takeshi Yoneda, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 1531 days.

(21) Appl. No.: 12/076,647

(22) Filed: Mar. 20, 2008

(65) Prior Publication Data

US 2008/0234911 A1 Sep. 25, 2008

(30) Foreign Application Priority Data

Mar. 22, 2007 (JP) .................................. 2007-075635

(51) Int. Cl.
*G06F 19/00* (2011.01)
*B60W 40/101* (2012.01)
*B60W 30/18* (2012.01)
*B60W 40/103* (2012.01)

(52) U.S. Cl.
CPC ....... *B60W 40/101* (2013.01); *B60W 30/18172* (2013.01); *B60W 40/103* (2013.01); *B60W 2550/148* (2013.01)

(58) Field of Classification Search
CPC .................... B60W 40/101; B60W 30/18172; B60W 40/103; B60W 2550/148
USPC ........ 701/70, 84, 36, 38, 41, 82, 90; 180/242, 180/243
See application file for complete search history.

(56) References Cited

U.S. PATENT DOCUMENTS

| | | | |
|---|---|---|---|
| 5,539,643 A | 7/1996 | Yamamoto et al. | |
| 5,685,618 A * | 11/1997 | Uchida et al. | 303/146 |
| 5,771,479 A * | 6/1998 | Yamamoto et al. | 701/70 |
| 6,615,124 B1 * | 9/2003 | Adachi | 701/70 |
| 6,890,041 B1 * | 5/2005 | Ribbens et al. | 303/126 |
| 2008/0221766 A1 * | 9/2008 | Maeda et al. | 701/70 |

FOREIGN PATENT DOCUMENTS

JP 5-214974 8/1993

* cited by examiner

*Primary Examiner* — John Q Nguyen
*Assistant Examiner* — Rodney P King
(74) *Attorney, Agent, or Firm* — Smith, Gambrell & Russell, LLP.

(57) ABSTRACT

A vehicle driving force control device controls engine torque so as to correct driver's request-engine-torque with the torque-down amount by an engine control unit, the torque-down amount being set into the lower one of a first torque-down amount and a second torque-down amount by a control-amount setting unit, the first torque-down amount being calculated on the basis of a relation between a tire force generated on a tire and a maximum tire force which the tire is capable of exercising against a current road-surface by a first traction control unit, the second torque-down amount being calculated on the basis of a slip rate of the tire by a second traction control unit.

22 Claims, 13 Drawing Sheets

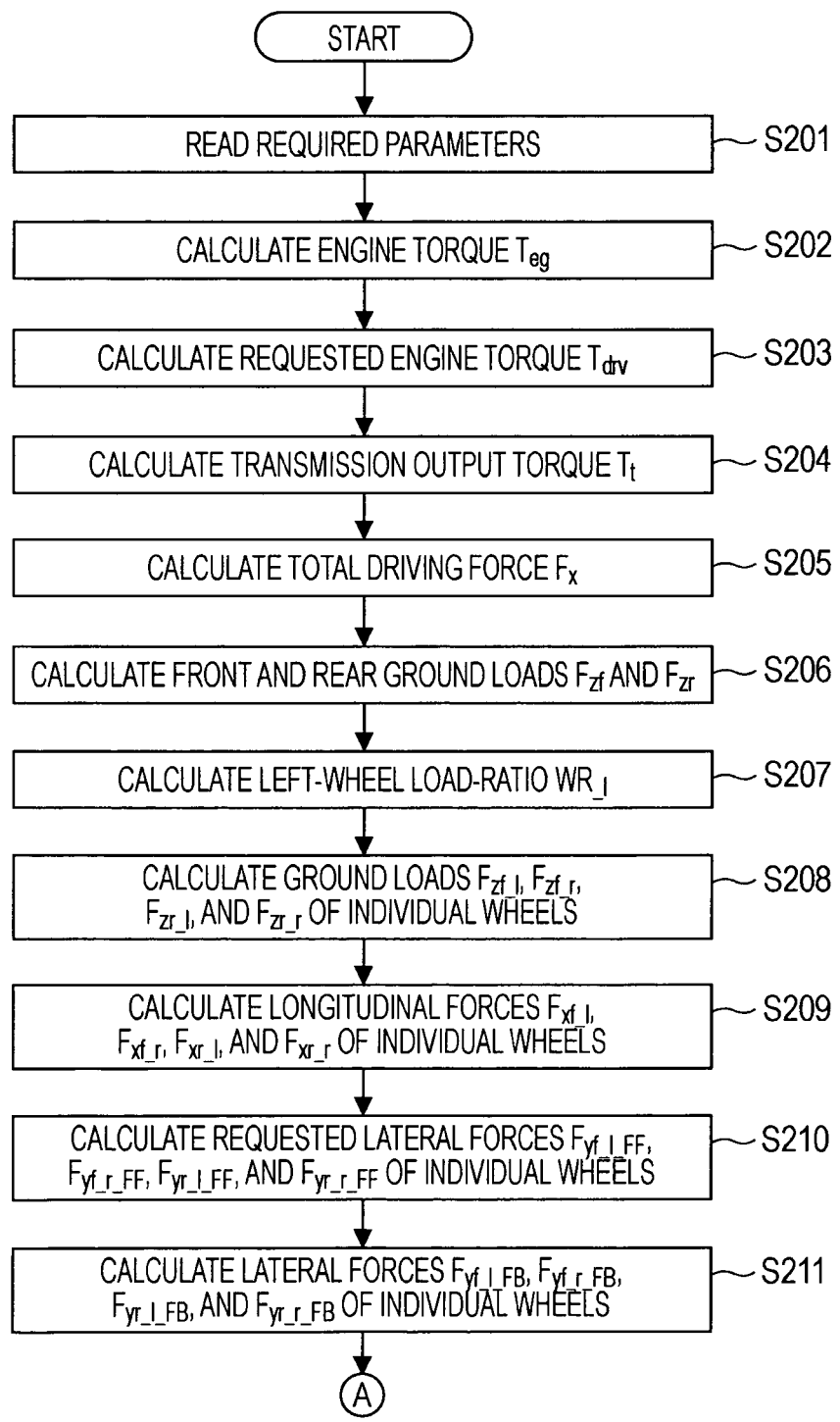

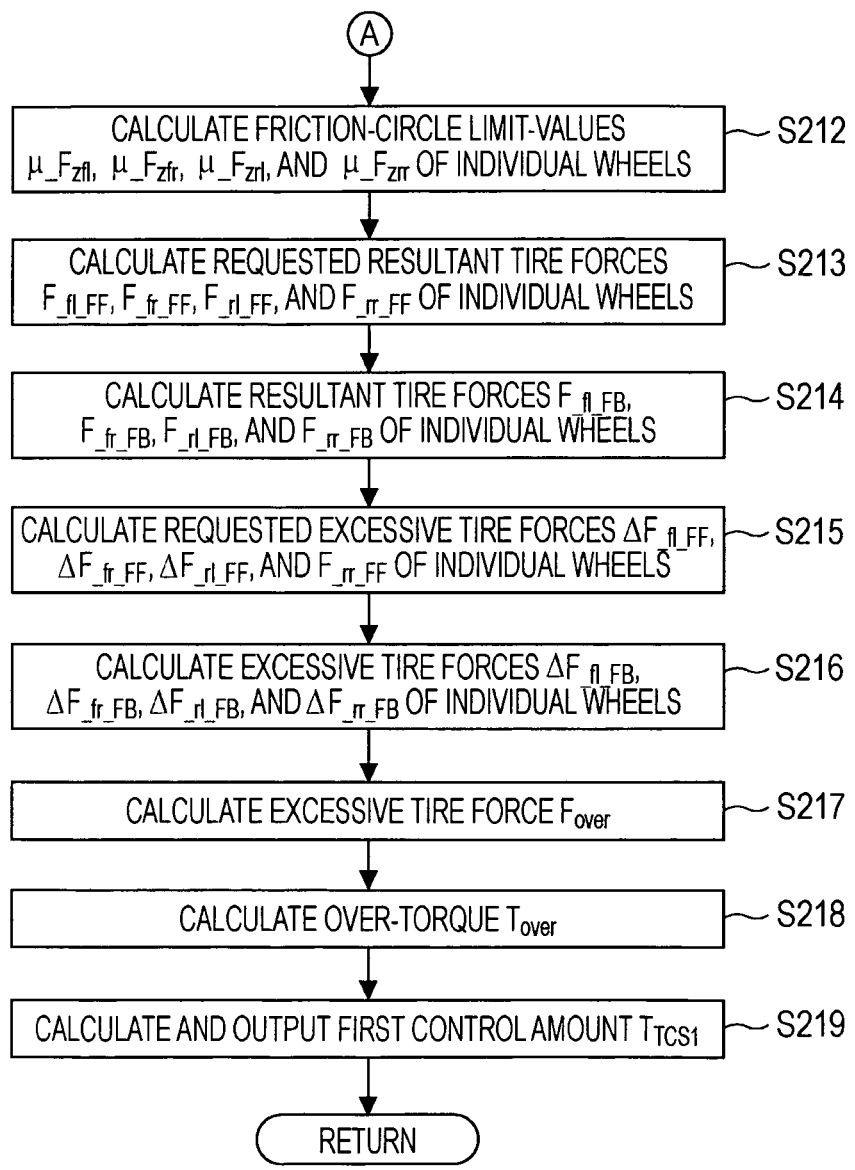

VEHICLE DRIVING FORCE CONTROL DEVICE

CROSS REFERENCES TO RELATED APPLICATIONS

The disclosure of Japanese Patent Application No. 2007-075635 filed on Mar. 22, 2007 including the specifications, drawings, and abstracts are incorporated by references herein.

BACKGROUND OF THE INVENTION

1. Field of the Invention

The present invention relates to a vehicle driving force control device for controlling a driving force to appropriately maintain a grip force of a vehicle wheel in various running conditions such as when a vehicle is in a starting mode, a straight running mode, or a turning mode.

2. Description of the Related Art

Various kinds of traction control devices for limiting the driving force to restrain a slipping of the vehicle wheel have been proposed and put to practical use.

For example, Japanese Unexamined Patent Application Publication No. 5-214974 discloses a technology where a slip rate of a drive wheel is calculated on the basis of the speed of the drive wheel and the speed of the vehicle body, and the engine output torque is reduced when the slip rate has exceeded a predetermined threshold value so as to perform feedback control on the throttle valve to restrain an excessive slipping of the drive wheel.

When a vehicle corners, a lateral force acting on a tire increases, whereas a permissible longitudinal driving force and the slip rate for maintaining a stable vehicle behavior decrease. Therefore, in a traction control device such as the one disclosed in Japanese Unexamined Patent Application Publication No. 5-214974, although it is necessary to detect a minute amount of slipping of the tire during cornering to stabilize the vehicle behavior, such detection is difficult since there is a limitation in the calculation accuracy for estimating the ground speed of the vehicle body. This makes it difficult to reduce the driving force to maintain the stability of the vehicle by determining a torque-down amount with high precision.

SUMMARY OF THE INVENTION

The present invention has been made under such circumstances, and it is an object of the present invention to provide a vehicle driving force control device that can control the driving force with high precision to improve the stability of the vehicle under all running conditions such as when the vehicle is undergoing a cornering mode, a straight running mode, or a starting mode.

The present invention provides a vehicle driving force control device that includes tire force estimating means configured to estimate a tire force generated on a tire, friction-circle limit-value estimating means configured to estimate a friction-circle limit-value as a maximum tire force which the tire is capable of exercising against a current road-surface, slip rate calculating means configured to calculate a slip rate of the tire, first torque-down amount calculating means configured to calculate a first torque-down amount on the basis of a relation between the tire force and the friction-circle limit-value, second torque-down amount calculating means configured to calculate a second torque-down amount on the basis of at least the slip rate, and driving-force setting means configured to set a driving force of the vehicle in accordance with the first torque-down amount and the second torque-down amount.

According to the vehicle driving force control device of the present invention, the driving force can be controlled with high precision so that the stability of the vehicle can be improved under all running conditions such as when the vehicle is undergoing a cornering mode, a straight running mode, or a starting mode.

BRIEF DESCRIPTION OF THE DRAWINGS

FIG. 4 is a flow chart of a first control amount calculation program;

FIG. 5 is a flow chart continuing from that in FIG. 4;

DESCRIPTION OF THE PREFERRED EMBODIMENTS

Embodiments of the present invention will now be described with reference to the drawings.

FIGS. 1 to 14 illustrate an embodiment of the present invention. In this embodiment, the vehicle is directed to a four-wheel-drive vehicle equipped with a center differential as an example. In this vehicle, a limited-slip differential clutch (tightening torque $T_{LSD}$) allows a longitudinal driving-force distribution to be adjustable on the basis of a base torque distribution $R_{f\_cd}$ by the center differential.

Figure 1:
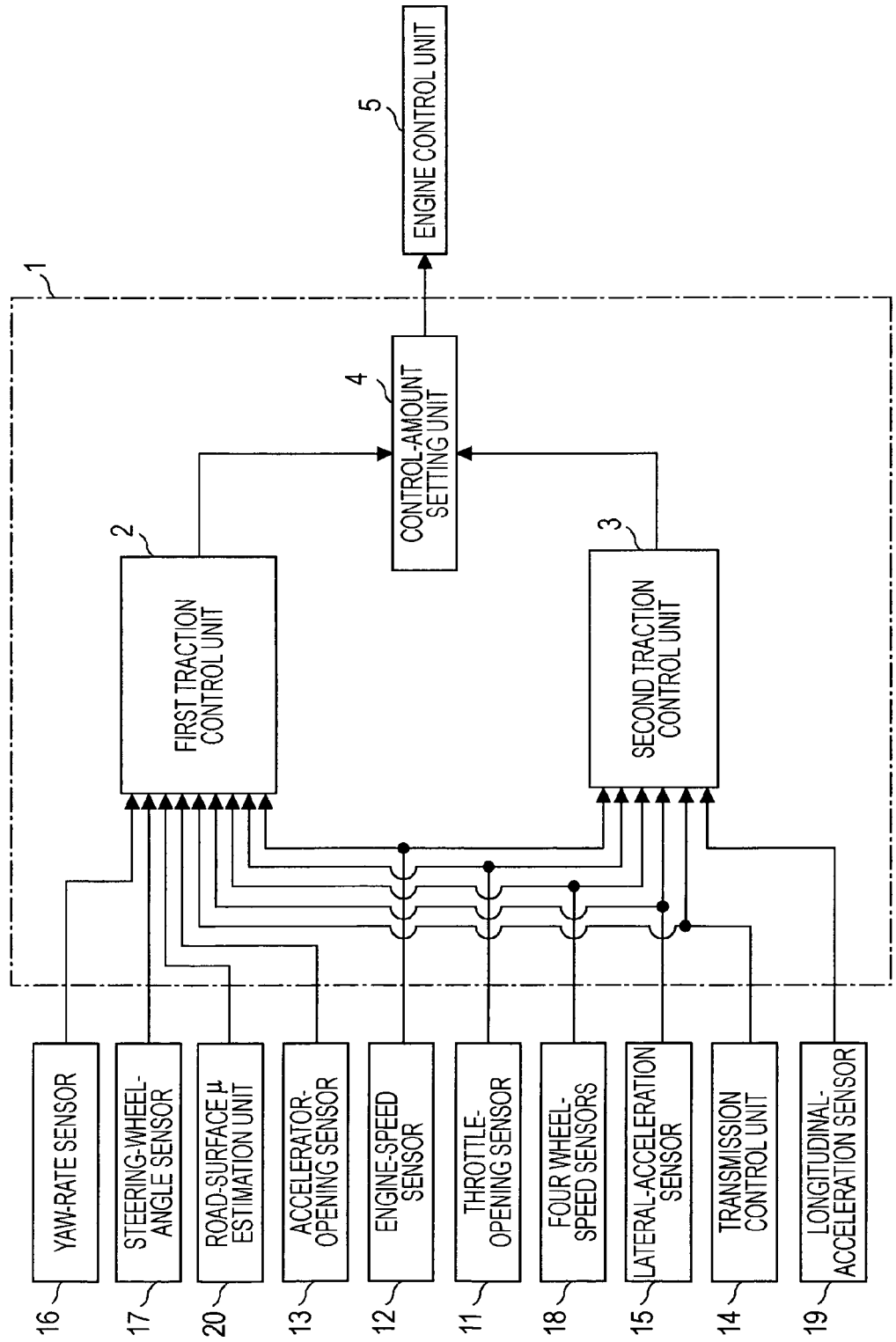
FIG. 1 is a functional block diagram of a driving force control device.

Referring to FIG. 1, reference numeral 1 denotes a vehicle driving force control device installed in a vehicle and for appropriately controlling a driving force. The driving force control device 1 is connected to a throttle-opening sensor 11, an engine-speed sensor 12, an accelerator-opening sensor 13, a transmission control unit 14, a lateral-acceleration sensor 15, a yaw-rate sensor 16, a steering-wheel-angle sensor 17, wheel-speed sensors 18 for individual wheels, a longitudinal-acceleration sensor 19, and a road-surface μ estimation unit 20, and receives therefrom signals indicating a throttle opening $\theta_{th}$, an engine speed $N_e$, an accelerator opening $\theta_{ACC}$, a main transmission gear ratio i, a turbine speed $N_t$ of a torque converter, a tightening torque $T_{LSD}$ of a limited-slip differential clutch, a lateral acceleration $(d^2y/dt^2)$, a yaw rate $\gamma$, a steering-wheel angle $\theta_H$, wheel speeds $\omega_{fl}$, $\omega_{fr}$, $\omega_{rl}$, and $\omega_{rr}$ of the individual wheels (the additional characters "fl", "fr", "rl", and "rr" respectively indicating a front left wheel, a front right wheel, a rear left wheel, and a rear right wheel), a longitudinal acceleration ($d^2x/dt^2$), and a road-surface friction coefficient μ.

Based on these input signals, the driving force control device 1 calculates an appropriate driving force value in accordance with a driving force control program to be described hereinafter, and outputs the driving force value to an engine control unit 5. The engine control unit 5 outputs a control signal to a throttle control unit (not shown) so as to allow a motor to be driven, whereby a throttle valve is actuated.

As shown in FIG. 1, the driving force control device 1 mainly includes a first traction control unit 2, a second traction control unit 3, and a control-amount setting unit 4.

The first traction control unit 2 is provided as first torque-down amount calculating means. The first traction control unit 2 is connected to the throttle-opening sensor 11, the engine-speed sensor 12, the accelerator-opening sensor 13, the transmission control unit 14, the lateral-acceleration sensor 15, the yaw-rate sensor 16, the steering-wheel-angle sensor 17, the wheel-speed sensors 18 for the individual wheels, and the road-surface μ estimation unit 20, and receives therefrom signals indicating a throttle opening $\theta_{th}$, an engine speed $N_e$, an accelerator opening $\theta_{ACC}$, a main transmission gear ratio i, a turbine speed $N_t$ of the torque converter, a tightening torque $T_{LSD}$ of the limited-slip differential clutch, a lateral acceleration ($d^2y/dt^2$), a yaw rate γ, a steering-wheel angle $\theta_H$, wheel speeds $\omega_{fl}$, $\omega_{fr}$, $\omega_{rl}$, and $\omega_{rr}$ of the individual wheels (the additional characters "fl", "fr", "rl", and "rr" respectively indicating a front left wheel, a front right wheel, a rear left wheel, and a rear right wheel), and a road-surface friction coefficient μ.

Figure 3A:
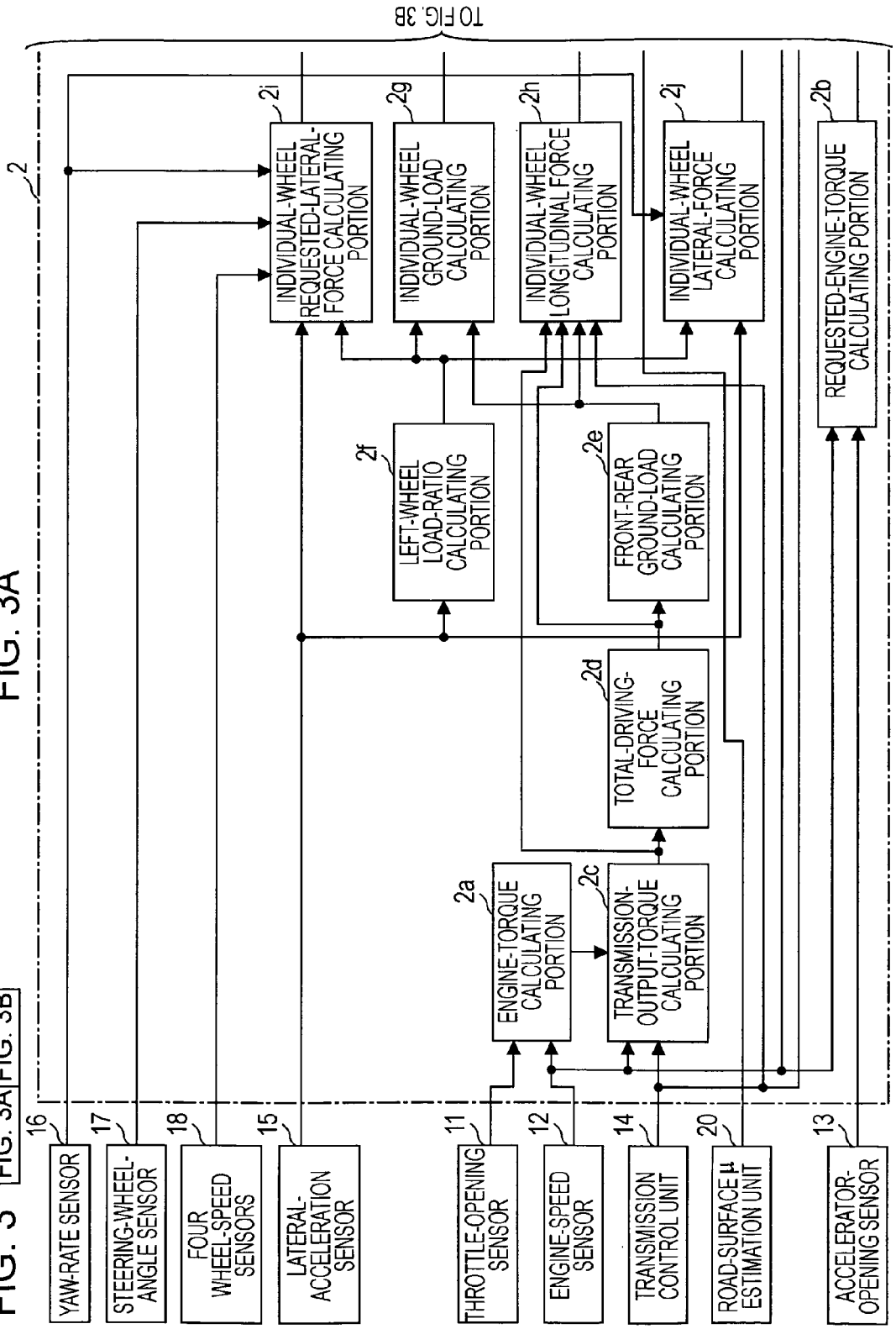
FIG. 3 is a functional block diagram of a first traction control unit.
Figure 3B:
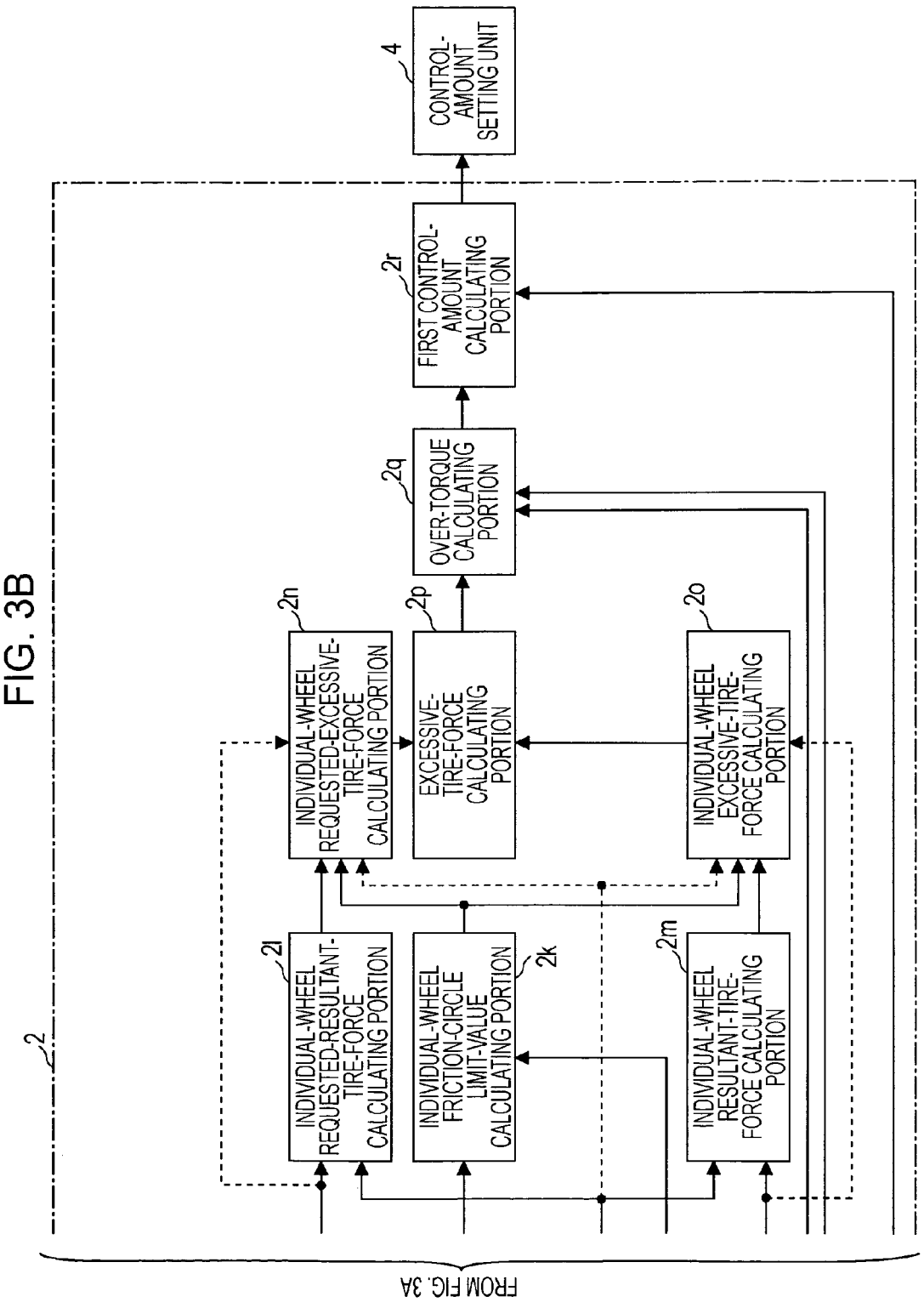
Figure 6:
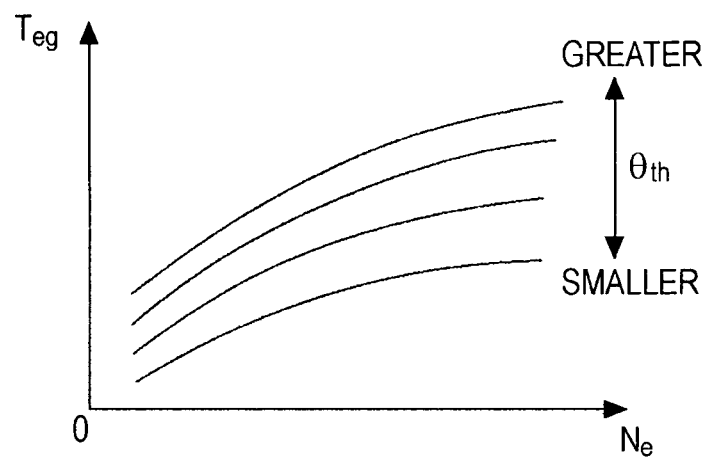
FIG. 6 illustrates an example of an engine torque set on the basis of an engine speed and a throttle opening.

Referring to FIG. 3, the first traction control unit 2 mainly includes an engine-torque calculating portion 2a, a requested-engine-torque calculating portion 2b, a transmission-output-torque calculating portion 2c, a total-driving-force calculating portion 2d, a front-rear ground-load calculating portion 2e, a left-wheel load-ratio calculating portion 2f, an individual-wheel ground-load calculating portion 2g, an individual-wheel longitudinal-force calculating portion 2h, an individual-wheel requested-lateral-force calculating portion 2i, an individual-wheel lateral-force calculating portion 2j, an individual-wheel friction-circle limit-value calculating portion 2k, an individual-wheel requested-resultant-tire-force calculating portion 2l, an individual-wheel resultant-tire-force calculating portion 2m, an individual-wheel requested-excessive-tire-force calculating portion 2n, an individual-wheel excessive-tire-force calculating portion 2o, an excessive-tire-force calculating portion 2p, an over-torque calculating portion 2q, and a first control-amount calculating portion 2r.

The engine-torque calculating portion 2a receives a throttle opening $\theta_{th}$ from the throttle-opening sensor 11 and an engine speed $N_e$ from the engine-speed sensor 12. The engine-torque calculating portion 2a refers to a map (such as the map shown in FIG. 6) preliminarily set based on engine characteristics so as to determine an engine torque $T_{eg}$ currently being generated. The engine-torque calculating portion 2a then outputs the determined engine torque $T_{eg}$ to the transmission-output-torque calculating portion 2c. The engine torque $T_{eg}$ may alternatively be read from the engine control unit 5.

The requested-engine-torque calculating portion 2b receives an accelerator opening $\theta_{ACC}$ from the accelerator-opening sensor 13. The requested-engine-torque calculating portion 2b refers to a preliminarily set map (such as the map of a relationship between an accelerator opening $\theta_{ACC}$ and a throttle opening $\theta_{th}$ shown in FIG. 7) so as to determine the throttle opening $\theta_{th}$, and determine the engine torque $T_{eg}$ based on the determined throttle opening $\theta_{th}$ from the aforementioned map shown in FIG. 6. The requested-engine-torque calculating portion 2b then outputs the determined engine torque $T_{eg}$ as a requested engine torque $T_{drv}$. The requested engine torque $T_{drv}$ may alternatively be determined from a preliminarily set map associated with an accelerator opening $\theta_{ACC}$, or be read from the engine control unit 5.

The transmission-output-torque calculating portion 2c receives the engine speed $N_e$ from the engine-speed sensor 12, a main transmission gear ratio i and a turbine speed $N_t$ of a torque converter from the transmission control unit 14, and the engine torque $T_{eg}$ from the engine-torque calculating portion 21a.

The transmission-output-torque calculating portion 2c calculates a transmission output torque $T_t$ from, for example, the following expression (1) and outputs the calculated transmission output torque $T_t$ to the total-driving-force calculating portion 2d and the individual-wheel longitudinal-force calculating portion 2h.

$$T_t = T_{eg} \cdot t \cdot i \qquad (1)$$

In this case, t indicates a torque ratio of the torque converter and is determined by referring to a preliminarily set map indicating a relationship between a rotational speed ratio e ($=N_t/N_e$) of the torque converter and a torque ratio of the torque converter.

The total-driving-force calculating portion 2d receives the transmission output torque $T_t$ from the transmission-output-torque calculating portion 2c.

The total-driving-force calculating portion 2d calculates a total driving force $F_x$ from, for example, the following expression (2) and outputs the calculated total driving force $F_x$ to the front-rear ground-load calculating portion 2e and the individual-wheel longitudinal-force calculating portion 2h.

$$F_x = T_t \cdot \eta \cdot i_f / R_t \qquad (2)$$

In this case, η indicates a transmission efficiency of a driving system, $i_f$ indicates a final gear ratio, and $R_t$ indicates a tire radius.

The front-rear ground-load calculating portion 2e receives the total driving force $F_x$ from the total-driving-force calculating portion 2d. The front-rear ground-load calculating portion 2e then calculates a front-wheel ground load $F_{zf}$ from the following expression (3) and outputs the calculated front-wheel ground load $F_{zf}$ to the individual-wheel ground-load calculating portion 2g and the individual-wheel longitudinal-force calculating portion 2h. In addition, the front-rear ground-load calculating portion 2e calculates a rear-wheel ground load $F_{zr}$ from the following expression (4) and outputs the calculated rear-wheel ground load $F_{zr}$ to the individual-wheel ground-load calculating portion 2g.

$$F_{zf} = W_f - ((m \cdot (d^2x/dt^2) \cdot h)/L) \qquad (3)$$

$$F_{zr} = W - F_{zf} \qquad (4)$$

In this case, $W_f$ indicates a front-wheel static load, m indicates a vehicle mass, ($d^2x/dt^2$) indicates a longitudinal acceleration ($=F_x/m$), h indicates the height of gravitational center, L indicates a wheel base, and W indicates a vehicle weight (gravitational force) ($=m \cdot G$; G being a gravitational acceleration).

The left-wheel load-ratio calculating portion 2f receives a lateral acceleration ($d^2y/dt^2$) from the lateral-acceleration sensor 15. The left-wheel load-ratio calculating portion 2f calculates a left-wheel load-ratio WR_*l* from the following expression (5) and outputs the calculated left-wheel load-ratio $WR\_l$ to the individual-wheel ground-load calculating portion $2g$, the individual-wheel requested-lateral-force calculating portion $2i$, and the individual-wheel lateral-force calculating portion $2j$.

$$WR\_l = 0.5 - ((d^2y/dt^2)/G) \cdot (h/L_{tred}) \quad (5)$$

In this case, $L_{tred}$ indicates an average of respective tread values of the front and rear wheels.

The individual-wheel ground-load calculating portion $2g$ receives the front-wheel ground load $F_{zf}$ and the rear-wheel ground load $F_{zr}$ from the front-rear ground-load calculating portion $2e$, and also receives the left-wheel load-ratio $WR\_l$ from the left-wheel load-ratio calculating portion $2f$. The individual-wheel ground-load calculating portion $2g$ calculates a front-left-wheel ground load $F_{zf\_l}$, a front-right-wheel ground load $F_{zf\_r}$, a rear-left-wheel ground load $F_{zr\_l}$, and a rear-right-wheel ground load $F_{zr\_r}$ from the following expressions (6), (7), (8), and (9), respectively, and outputs these calculated values to the individual-wheel friction-circle limit-value calculating portion $2k$.

$$F_{zf\_l} = F_{zf} \cdot WR\_l \quad (6)$$

$$F_{zf\_r} = F_{zf}(1 - WR\_l) \quad (7)$$

$$F_{zr\_l} = F_{zr} \cdot WR\_l \quad (8)$$

$$F_{zr\_r} = F_{zr}(1 - WR\_l) \quad (9)$$

The individual-wheel longitudinal-force calculating portion $2h$ receives a tightening torque $T_{LSD}$ of the limited-slip differential clutch in the center differential from the transmission control unit 14, the transmission output torque $T_t$ from the transmission-output-torque calculating portion $2c$, the total driving force $F_x$ from the total-driving-force calculating portion $2d$, and the front-wheel ground load $F_{zf}$ from the front-rear ground-load calculating portion $2e$. In accordance with a procedure to be described hereinafter, the individual-wheel longitudinal-force calculating portion $2h$ calculates a front-left-wheel longitudinal force $F_{xf\_l}$, a front-right-wheel longitudinal force $F_{xf\_r}$, a rear-left-wheel longitudinal force $F_{xr\_l}$, and a rear-right-wheel longitudinal force $F_{xr\_r}$, and outputs these calculated values to the individual-wheel requested-resultant-tire-force calculating portion $2l$ and the individual-wheel resultant-tire-force calculating portion $2m$.

An example of the procedure for calculating the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ will be described below.

First, a front-wheel load distribution rate $W_{R\_f}$ is calculated from the following expression (10):

$$W_{R\_f} = F_{zf}/W \quad (10)$$

Then, a minimum front-wheel longitudinal torque $T_{fmin}$ and a maximum front-wheel longitudinal torque $T_{fmax}$ are calculated from the following expressions (11) and (12):

$$T_{fmin} = T_t \cdot R_{f\_cd} - T_{LSD} (\geq 0) \quad (11)$$

$$T_{fmax} = T_t \cdot R_{f\_cd} + T_{LSD} (\geq 0) \quad (12)$$

Subsequently, a minimum front-wheel longitudinal force $F_{xfmin}$ and a maximum front-wheel longitudinal force $F_{xfmax}$ are calculated from the following expressions (13) and (14):

$$F_{xfmin} = T_{fmin} \cdot \eta \cdot i_f / R_t \quad (13)$$

$$F_{xfmax} = T_{fmax} \cdot \eta \cdot i_f / R_t \quad (14)$$

Next, a determination value I is set in the following manner.

When $W_{R\_f} \leq F_{xfmin}/F_x$, it is determined that limited-slip differential torque is increasing at the rear wheels, thereby setting the determination value I to 1.

When $W_{R\_f} \geq F_{xfmax}/F_x$, it is determined that limited-slip differential torque is increasing at the front wheels, thereby setting the determination value I to 3.

In cases other than the above (i.e. when $F_{xfmin}/F_x < W_{R\_f} < F_{xfmax}/F_x$), a normal condition is confirmed, thereby setting the determination value I to 2.

In accordance with the determination value I, a front-wheel longitudinal force $F_{xf}$ is calculated as follows:

When $I=1$: $F_{xf} = T_{fmin} \cdot \eta \cdot i_f / R_t$ (15)

When $I=2$: $F_{xf} = F_{xf} = F_x \cdot W_{R\_f}$ (16)

When $I=3$: $F_{xf} = T_{fmax} \cdot \eta \cdot i_f / R_t$ (17)

Based on the front-wheel longitudinal force $F_{xf}$ calculated from the expression (15), (16), or (17), a rear-wheel longitudinal force $F_{xr}$ is calculated from the following expression (18):

$$F_{xr} = F_x - F_{xf} \quad (18)$$

Using the front-wheel longitudinal force $F_{xf}$ and the rear-wheel longitudinal force $F_{xr}$, the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ are calculated from the following expressions (19) to (22):

$$F_{xf\_l} = F_{xf}/2 \quad (19)$$

$$F_{xf\_r} = F_{xf\_l} \quad (20)$$

$$F_{xr\_l} = F_{xr}/2 \quad (21)$$

$$F_{xr\_r} = F_{xr\_l} \quad (22)$$

The calculations of the longitudinal forces of the individual wheels described above in the first embodiment are simply examples, and are appropriately selectable according to the driving method or driving mechanism of the vehicle.

The individual-wheel requested-lateral-force calculating portion $2i$ receives the lateral acceleration $(d^2y/dt^2)$ from the lateral-acceleration sensor 15, a yaw rate $\gamma$ from the yaw-rate sensor 16, a steering-wheel angle $\theta_H$ from the steering-wheel-angle sensor 17, wheel speeds $\omega_{fl}$, $\omega_{fr}$, $\omega_{rl}$, and $\omega_{rr}$ of the four wheels from the wheel-speed sensors 18 for the respective (four) wheels, and the left-wheel load-ratio $WR\_l$ from the left-wheel load-ratio calculating portion $2f$.

In accordance with a procedure to be described below (i.e. the flow chart shown in FIG. 8), an additional yaw moment $M_z\theta$ is calculated. Based on this additional yaw moment, a requested front-wheel lateral force $F_{yf\_FF}$ is calculated from the following expression (23), and a requested rear-wheel lateral force $F_{yr\_FF}$ is calculated from the following expression (24). Based on the requested front-wheel lateral force $F_{yf\_FF}$ and the requested rear-wheel lateral force $F_{yr\_FF}$, a front-left-wheel requested lateral force $F_{yf\_l\_FF}$, a front-right-wheel requested lateral force $F_{yf\_r\_FF}$, a rear-left-wheel requested lateral force $F_{yr\_l\_FF}$, and a rear-right-wheel requested lateral force $F_{yr\_r\_FF}$ are calculated from the following expressions (25) to (28) and are output to the individual-wheel requested-resultant-tire-force calculating portion $2l$.

$$F_{yf\_FF} = M_z\theta/L \quad (23)$$

$$F_{yr\_FF} = (-I_z \cdot (d\gamma/dt) + m \cdot (d^2y/dt^2) \cdot L_f)/L \quad (24)$$

In this case, $I_z$ indicates a yaw moment of inertia of the vehicle, and $L_f$ indicates a distance between the front axle and the center of gravity.

$$F_{yf\_l\_FF} = F_{yf\_FF} \cdot WR\_l \tag{25}$$

$$F_{yf\_r\_FF} = F_{yf\_FF} \cdot (1 - WR\_l) \tag{26}$$

$$F_{yr\_l\_FF} = F_{yr\_FF} \cdot WR\_l \tag{27}$$

$$F_{yr\_r\_FF} = F_{yr\_FF} \cdot (1 - WR\_l) \tag{28}$$

Figure 8:
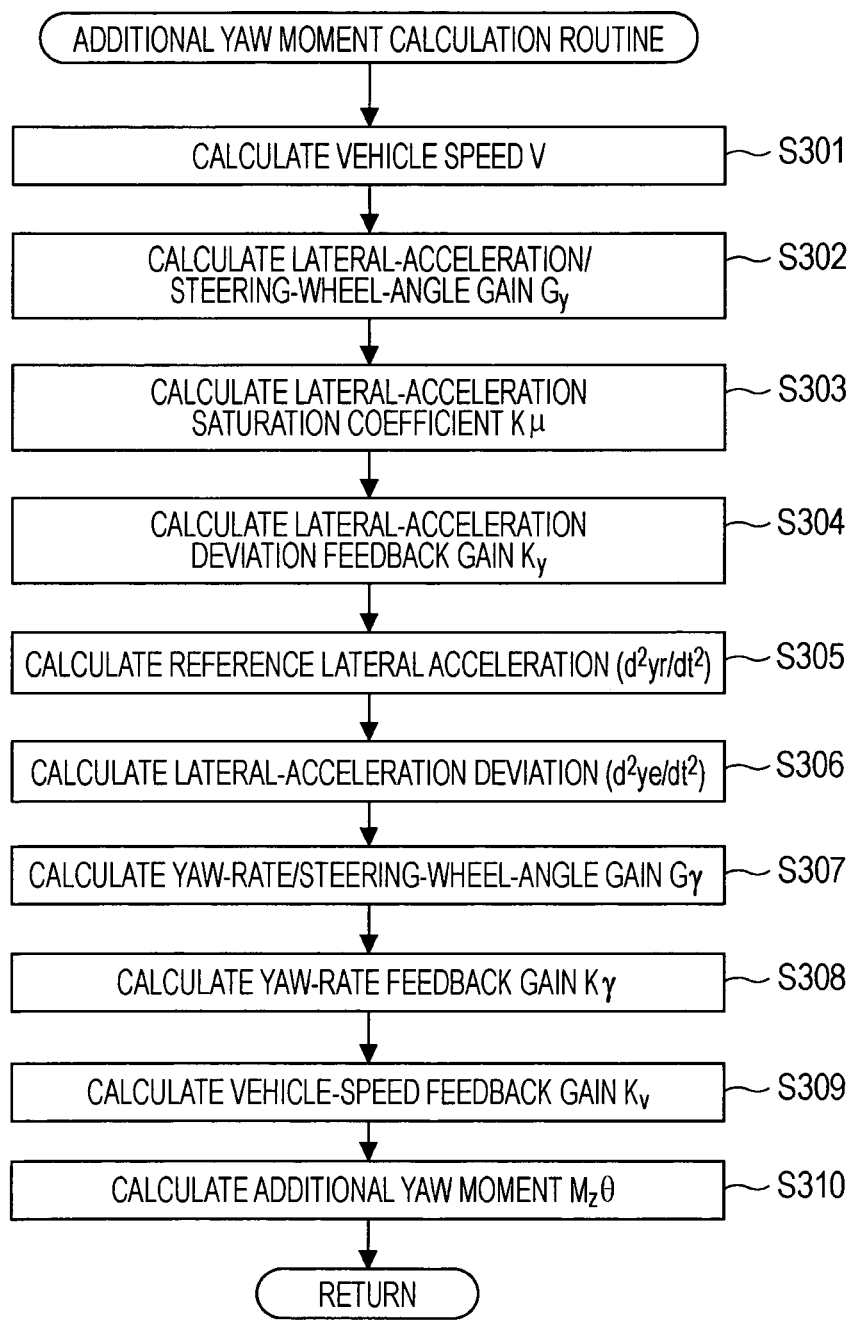
FIG. 8 is a flow chart of an additional-yaw-moment calculation routine.

Next, as shown in FIG. 8, the additional yaw moment $M_z\theta$ is determined. First, a vehicle speed V is calculated in step S301 (e.g. $V = (\omega_{fl} + \omega_{fr} + \omega_{rl} + \omega_{rr})/4$) and then a lateral-acceleration/steering-wheel-angle gain $G_y$ is calculated in step S302 using the following expression (29):

$$G_y = (1/(1 + A \cdot V^2)) \cdot (V^2/L) \cdot (1/n) \tag{29}$$

In this case, A indicates a stability factor, and n indicates a steering gear ratio.

Figure 9A:
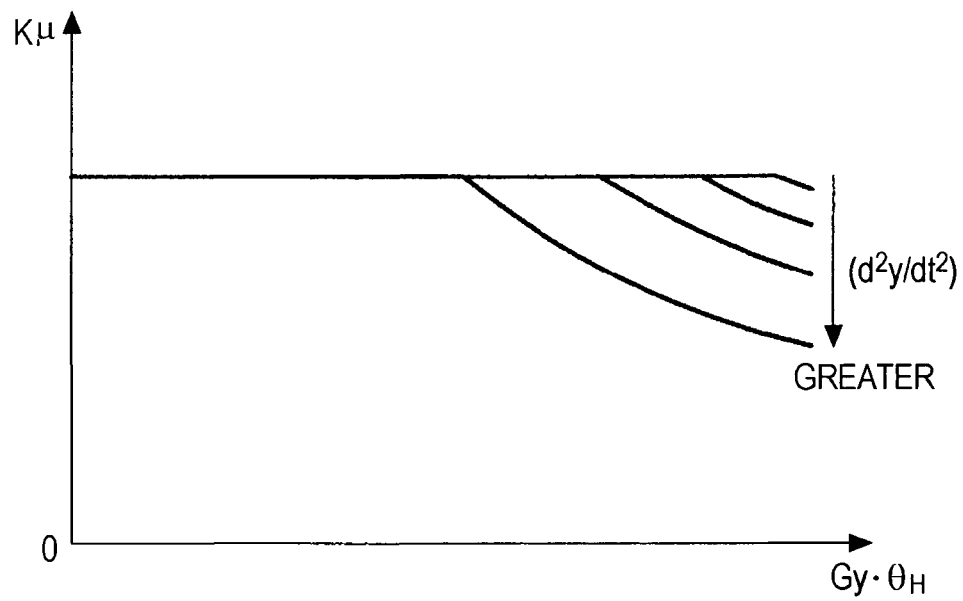
FIGS. 9A and 9B illustrate a lateral-acceleration saturation coefficient.
Figure 9B:
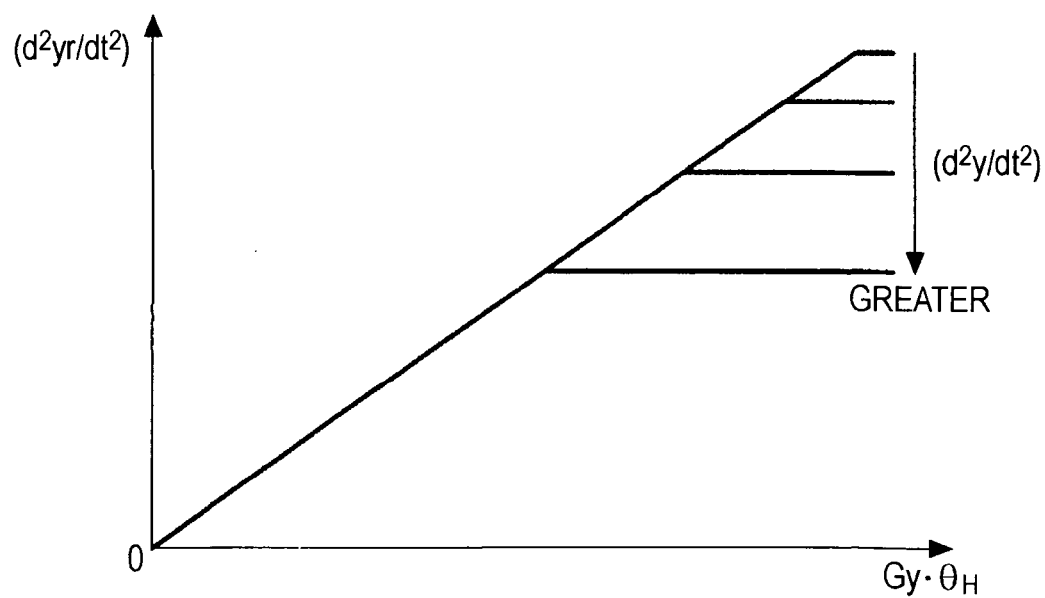

The process then proceeds to step S303, which is a step for referring to a map preliminarily set in accordance with a value $(G_y \cdot \theta_H)$ obtained by multiplying the lateral-acceleration/steering-wheel-angle gain $G_y$ by the steering-wheel angle $\theta_H$ and the lateral acceleration $(d^2y/dt^2)$ so as to calculate a lateral-acceleration saturation coefficient $K\mu$. Referring to FIG. 9A, this map used for determining a lateral-acceleration saturation coefficient $K\mu$ is preliminarily set in accordance with a value $(G_y \cdot \theta_H)$ obtained by multiplying the lateral-acceleration/steering-wheel-angle gain $G_y$ by the steering-wheel angle $\theta_H$ and the lateral acceleration $(d^2y/dt^2)$, and decreases with increasing lateral acceleration $(d^2y/dt^2)$ in a state where the steering-wheel angle $\theta_H$ is greater than or equal to a predetermined value. This implies that when the $G_y \cdot \theta_H$ is a large value, the lateral acceleration $(d^2y/dt^2)$ becomes greater towards a higher $\mu$ road, but the lateral acceleration $(d^2y/dt^2)$ is less likely to occur on a low $\mu$ road. Consequently, referring to FIG. 9B, a reference lateral acceleration $(d^2yr/dt^2)$ to be described hereinafter is set to a low value in the case where the vehicle is considered to be on a high $\mu$ road based on the $G_y \cdot \theta_H$ being a large value and the lateral acceleration $(d^2y/dt^2)$ being a large value, so that the correction amount with respect to the additional yaw moment $M_z\theta$ is set to a small amount.

In step S304, a lateral-acceleration deviation feedback gain $K_y$ is calculated from the following expression (30):

$$K_y = K\theta/G_y \tag{30}$$

In this case, $K\theta$ indicates a steering-angle feedback gain, which is calculated from the following expression (31):

$$K\theta = (L_f \cdot K_f)/n \tag{31}$$

Here, $K_f$ indicates an equivalent cornering power of the front axle.

Specifically, the lateral-acceleration deviation feedback gain $K_y$ is determined from the expression (30) as a target value (maximum value) in view of the case where the additional yaw moment $M_z\theta$ (stationary value) becomes zero in a state where the steering is absolutely ineffective ($\gamma = 0$, $(d^2y/dt^2) = 0$) on a significantly low $\mu$ road.

Subsequently, in step S305, a reference lateral acceleration $(d^2yr/dt^2)$ is calculated from the following expression (32):

$$(d^2yr/dt^2) = K\mu \cdot G_y \cdot (1/(1+T_y \cdot s)) \cdot \theta_H \tag{32}$$

In this case, s indicates a differential operator, and $T_y$ indicates a first-order-lag time constant of lateral acceleration. This first-order-lag time constant $T_y$ is calculated from, for example, the following expression (33) with an equivalent cornering power of the rear axle indicated by $K_r$:

$$T_y = I_z/(L \cdot K_r) \tag{33}$$

In step S306, a lateral-acceleration deviation $(d^2ye/dt^2)$ is calculated from the following expression (34):

$$(d^2ye/dt^2) = (d^2y/dt^2) - (d^2yr/dt^2) \tag{34}$$

Subsequently, in step S307, a yaw-rate/steering-wheel-angle gain $G\gamma$ is calculated from the following expression (35):

$$G\gamma = (1/(1 + A \cdot V^2)) \cdot (V/L) \cdot (1/n) \tag{35}$$

In step S308, a yaw-rate feedback gain $K\gamma$ is calculated from the following expression (36) in view of the case where, for example, the additional yaw moment $M_z\theta$ (stationary value) becomes zero at the time of grip driving (when $(d^2ye/dt^2) = 0$).

$$K\gamma = K\theta/G\gamma \tag{36}$$

Figure 10:
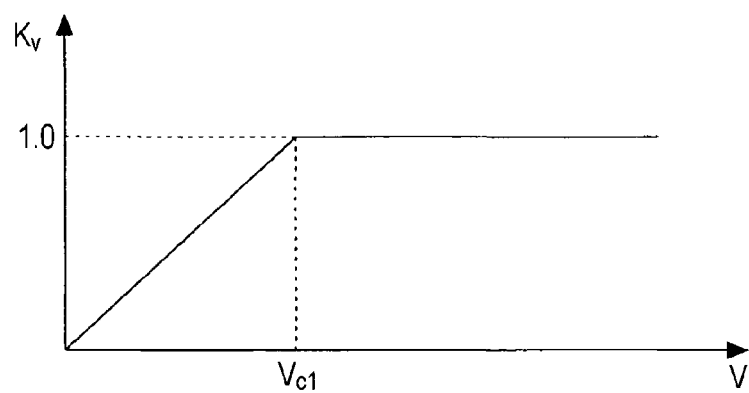
FIG. 10 shows a characteristic map of a vehicle-speed feedback gain.

In step S309, a vehicle-speed feedback gain $K_v$ is calculated on the basis of a preliminarily set map. This map is set so as to avoid an undesired additional yaw moment $M_z\theta$ in a low speed range, as shown in, for example, FIG. 10. In FIG. 10, $V_{c1}$ represents, for example, 40 km/h.

In step S310, an additional yaw moment $M_z\theta$ is calculated from the following expression (37):

$$M_z\theta = K_v \cdot (-K\gamma \cdot \gamma + K_y \cdot (d^2ye/dt^2) + K\theta \cdot \theta_H) \tag{37}$$

Figure 11:
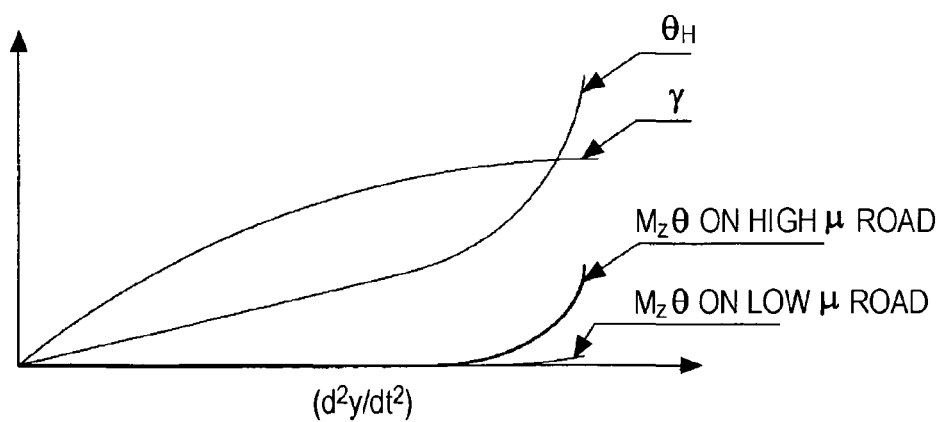
FIG. 11 illustrates a difference in additional yaw moment value between a high μ road and a low μ road.

As shown in expression (37), the term $-K\gamma \cdot \gamma$ corresponds to a yaw moment responding to a yaw rate $\gamma$, the term $K\theta \cdot \theta_H$ corresponds to a yaw moment responding to a steering-wheel angle $\theta_H$, and the term $K_y \cdot (d^2ye/dt^2)$ corresponds to a correction value of the yaw moment. Therefore, when the vehicle is driven with a large lateral acceleration $(d^2y/dt^2)$ on a high $\mu$ road as shown in FIG. 11, the additional yaw moment $M_z\theta$ also becomes a large value, thereby enhancing the driving performance. On the other hand, when the vehicle is driven on a low $\mu$ road, the additional yaw moment $M_z\theta$ is prevented from increasing since the additional yaw moment $M_z\theta$ is reduced due to the effect of the correction value, thereby allowing for stable driving performance.

The individual-wheel lateral-force calculating portion 2j receives the lateral acceleration $(d^2y/dt^2)$ from the lateral-acceleration sensor 15, the yaw rate $\gamma$ from the yaw-rate sensor 16, and the left-wheel load-ratio WR_l from the left-wheel load-ratio calculating portion 2f. Then, the individual-wheel lateral-force calculating portion 2j calculates a front-wheel lateral force $F_{yf\_FB}$ and a rear-wheel lateral force $F_{yr\_FB}$ from the following expressions (38) and (39), respectively. Based on the front-wheel lateral force $F_{yf\_FB}$ and the rear-wheel lateral force $F_{yr\_FB}$, the individual-wheel lateral-force calculating portion 2j calculates a front-left-wheel lateral force $F_{yf\_l\_FB}$, a front-right-wheel lateral force $F_{yf\_r\_FB}$, a rear-left-wheel lateral force $F_{yr\_l\_FB}$, and a rear-right-wheel lateral force $F_{yr\_r\_FB}$ from the following expressions (40) to (43), and outputs these calculated values to the individual-wheel resultant-tire-force calculating portion 2m.

$$F_{yf\_FB} = (I_z \cdot (d\gamma/dt) + m \cdot (d^2y/dt^2) \cdot L_r)/L \tag{38}$$

$$F_{yr\_FB} = (-I_z \cdot (d\gamma/dt) + m \cdot (d^2y/dt^2) \cdot L_f)/L \tag{39}$$

Here, $L_r$ indicates a distance between the rear axle and the center of gravity.

$$F_{yf\_l\_FB} = F_{yf\_FB} \cdot WR\_l \tag{40}$$

$$F_{yf\_r\_FB} = F_{yf\_FB} \cdot (1 - WR\_l) \tag{41}$$

$$F_{yr\_l\_FB} = F_{yr\_FB} \cdot WR\_l \quad (42)$$

$$F_{yr\_r\_FB} = F_{yr\_FB} \cdot (1 - WR\_l) \quad (43)$$

The individual-wheel friction-circle limit-value calculating portion 2k receives a road-surface friction coefficient μ from the road-surface μ estimation unit 20, and the front-left-wheel ground load $F_{zf\_l}$, the front-right-wheel ground load $F_{zf\_r}$, the rear-left-wheel ground load $F_{zr\_l}$, and the rear-right-wheel ground load $F_{zr\_r}$ from the individual-wheel ground-load calculating portion 2g.

The individual-wheel friction-circle limit-value calculating portion 2k then calculates a front-left-wheel friction-circle limit-value $\mu\_F_{zfl}$, a front-right-wheel friction-circle limit-value $\mu\_F_{zfr}$, a rear-left-wheel friction-circle limit-value $\mu\_F_{zrl}$, and a rear-right-wheel friction-circle limit-value $\mu\_F_{zrr}$ from the following expressions (44) to (47), and outputs the calculated values to the individual-wheel requested-excessive-tire-force calculating portion 2n and the individual-wheel excessive-tire-force calculating portion 2o. In other words, the individual-wheel friction-circle limit-value calculating portion 2k is provided as friction-circle limit-value estimating means as a function for estimating a maximum tire force which the tire is capable of exercising against a current road-surface.

$$\mu\_F_{zfl} = \mu \cdot F_{zf\_l} \quad (44)$$

$$\mu\_F_{zfr} = \mu \cdot F_{zf\_r} \quad (45)$$

$$\mu\_F_{zrl} = \mu \cdot F_{zr\_l} \quad (46)$$

$$\mu\_F_{zrr} = \mu \cdot F_{zr\_r} \quad (47)$$

The individual-wheel requested-resultant-tire-force calculating portion 2l receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculating portion 2h, and also receives the front-left-wheel requested lateral force $F_{yf\_l\_FF}$, the front-right-wheel requested lateral force $F_{yf\_r\_FF}$, the rear-left-wheel requested lateral force $F_{yr\_l\_FF}$, and the rear-right-wheel requested lateral force $F_{yr\_r\_FF}$ from the individual-wheel requested-lateral-force calculating portion 2i. The individual-wheel requested-resultant-tire-force calculating portion 2l calculates a front-left-wheel requested resultant tire force $F\_fl\_FF$, a front-right-wheel requested resultant tire force $F\_fr\_FF$, a rear-left-wheel requested resultant tire force $F\_rl\_FF$, and a rear-right-wheel requested resultant tire force $F\_rr\_FF$ from the following expressions (48) to (51), and outputs these calculated values to the individual-wheel requested-excessive-tire-force calculating portion 2n. In other words, the individual-wheel requested-resultant-tire-force calculating portion 2l is provided as first-tire-force estimating means.

$$F\_fl\_FF = (F_{xf\_l}^2 + F_{yf\_l\_FF}^2)^{1/2} \quad (48)$$

$$F\_fr\_FF = (F_{xf\_r}^2 + F_{yf\_r\_FF}^2)^{1/2} \quad (49)$$

$$F\_rl\_FF = (F_{xr\_l}^2 + F_{yr\_l\_FF}^2)^{1/2} \quad (50)$$

$$F\_rr\_FF = (F_{xr\_r}^2 + F_{yr\_r\_FF}^2)^{1/2} \quad (51)$$

The individual-wheel resultant-tire-force calculating portion 2m receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculating portion 2h, and also receives the front-left-wheel lateral force $F_{yf\_l\_FB}$, the front-right-wheel lateral force $F_{yf\_r\_FB}$, the rear-left-wheel lateral force $F_{yr\_l\_FB}$, and the rear-right-wheel lateral force $F_{yr\_r\_FB}$ from the individual-wheel lateral-force calculating portion 2j. The individual-wheel resultant-tire-force calculating portion 2m calculates a front-left-wheel resultant tire force $F\_fl\_FB$, a front-right-wheel resultant tire force $F\_fr\_FB$, a rear-left-wheel resultant tire force $F\_rl\_FB$, and a rear-right-wheel resultant tire force $F\_rr\_FB$ from the following expressions (52) to (55), and outputs these calculated values to the individual-wheel excessive-tire-force calculating portion 2o. In other words, the individual-wheel resultant-tire-force calculating portion 2m is provided as second-tire-force estimating means.

$$F\_fl\_FB = (F_{xf\_l}^2 + F_{yf\_l\_FB}^2)^{1/2} \quad (52)$$

$$F\_fr\_FB = (F_{xf\_r}^2 + F_{yf\_r\_FB}^2)^{1/2} \quad (53)$$

$$F\_rl\_FB = (F_{xr\_l}^2 + F_{yr\_l\_FB}^2)^{1/2} \quad (54)$$

$$F\_rr\_FB = (F_{xr\_r}^2 + F_{yr\_r\_FB}^2)^{1/2} \quad (55)$$

The individual-wheel requested-excessive-tire-force calculating portion 2n receives the front-left-wheel friction-circle limit-value $\mu\_F_{zfl}$, the front-right-wheel friction-circle limit-value $\mu\_F_{zfr}$, the rear-left-wheel friction-circle limit-value $\mu\_F_{zrl}$, and the rear-right-wheel friction-circle limit-value $\mu\_F_{zrr}$ from the individual-wheel friction-circle limit-value calculating portion 2k, and also receives the front-left-wheel requested resultant tire force $F\_fl\_FF$, the front-right-wheel requested resultant tire force $F\_fr\_FF$, the rear-left-wheel requested resultant tire force $F\_rl\_FF$, and the rear-right-wheel requested resultant tire force $F\_rr\_FF$ from the individual-wheel requested-resultant-tire-force calculating portion 2l. The individual-wheel requested-excessive-tire-force calculating portion 2n then calculates a front-left-wheel requested excessive tire force $\Delta F\_fl\_FF$, a front-right-wheel requested excessive tire force $\Delta F\_fr\_FF$, a rear-left-wheel requested excessive tire force $\Delta F\_rl\_FF$, and a rear-right-wheel requested excessive tire force $\Delta F\_rr\_FF$ from the following expressions (56) to (59), and outputs these calculated values to the excessive-tire-force calculating portion 2p. In other words, the individual-wheel requested-excessive-tire-force calculating portion 2n is provided as first-excessive-tire-force estimating means.

$$\Delta F\_fl\_FF = F\_fl\_FF - \mu\_F_{zfl} \quad (56)$$

$$\Delta F\_fr\_FF = F\_fr\_FF - \mu\_F_{zfr} \quad (57)$$

$$\Delta F\_rl\_FF = F\_rl\_FF - \mu\_F_{zrl} \quad (58)$$

$$\Delta F\_rr\_FF = F\_rr\_FF - \mu\_F_{zrr} \quad (59)$$

The individual-wheel excessive-tire-force calculating portion 2o receives the front-left-wheel friction-circle limit-value $\mu\_F_{zfl}$, the front-right-wheel friction-circle limit-value $\mu\_F_{zfr}$, the rear-left-wheel friction-circle limit-value $\mu\_F_{zrl}$, and the rear-right-wheel friction-circle limit-value $\mu\_F_{zrr}$ from the individual-wheel friction-circle limit-value calculating portion 2k, and also receives the front-left-wheel resultant tire force $F\_fl\_FB$, the front-right-wheel resultant tire force $F\_fr\_FB$, the rear-left-wheel resultant tire force $F\_rl\_FB$, and the rear-right-wheel resultant tire force $F\_rr\_FB$ from the individual-wheel resultant-tire-force calculating portion 2m. The individual-wheel excessive-tire-force calculating portion 2o then calculates a front-left-wheel excessive tire force $\Delta F\_fl\_FB$, a front-right-wheel excessive tire force $\Delta F\_fr\_FB$, a rear-left-wheel excessive tire force $\Delta F\_rl\_FB$, and a rear-right-wheel excessive tire force $\Delta F\_rr\_FB$ from the following expressions (60) to (63), and outputs these calculated values to the excessive-tire-force calculating portion 2p. In other words, the individual-wheel excessive-tire-force calculating portion 2o is provided as second-excessive-tire-force estimating means.

$$\Delta F\_fl\_FB = F\_fl\_FB - \mu\_F_{zfl} \tag{60}$$

$$\Delta F\_fr\_FB = F\_fr\_FB - \mu\_F_{zfr} \tag{61}$$

$$\Delta F\_rl\_FB = F\_rl\_FB - \mu\_F_{zrl} \tag{62}$$

$$\Delta F\_rr\_FB = F\_rr\_FB - \mu\_F_{zrr} \tag{63}$$

The excessive-tire-force calculating portion 2p receives the front-left-wheel requested excessive tire force $\Delta F\_fl\_FF$, the front-right-wheel requested excessive tire force $\Delta F\_fr\_FF$, the rear-left-wheel requested excessive tire force $\Delta F\_rl\_FF$, and the rear-right-wheel requested excessive tire force $\Delta F\_rr\_FF$ from the individual-wheel requested-excessive-tire-force calculating portion 2n, and also receives the front-left-wheel excessive tire force $\Delta F\_fl\_FB$, the front-right-wheel excessive tire force $\Delta F\_fr\_FB$, the rear-left-wheel excessive tire force $\Delta F\_rl\_FB$, and the rear-right-wheel excessive tire force $\Delta F\_rr\_FB$ from the individual-wheel excessive-tire-force calculating portion 2o. The excessive-tire-force calculating portion 2p then compares a total value of the requested excessive tire forces $\Delta F\_fl\_FF$, $\Delta F\_fr\_FF$, $\Delta F\_rl\_FF$, and $\Delta F\_rr\_FF$ with a total value of the excessive tire forces $\Delta F\_fl\_FB$, $\Delta F\_fr\_FB$, $\Delta F\_rl\_FB$, and $\Delta F\_rr\_FB$, and sets the larger one of the two values as an excessive tire force $F_{over}$.

$$F_{over} = \text{MAX}((\Delta F\_fl\_FF + \Delta F\_fr\_FF + \Delta F\_rl\_FF + \Delta F\_rr\_FF), (\Delta F\_fl\_FB + \Delta F\_fr\_FB + \Delta F\_rl\_FB + \Delta F\_rr\_FB)) \tag{64}$$

The over-torque calculating portion 2q receives the engine speed $N_e$ from the engine-speed sensor 12, the main transmission gear ratio i and the turbine speed $N_t$ of the torque converter from the transmission control unit 14, and the excessive tire force $F_{over}$ from the excessive-tire-force calculating portion 2p. The over-torque calculating portion 2q calculates an over-torque $T_{over}$ from the following expression (65), and outputs the calculated value to the control-amount calculating portion 2r.

$$T_{over} = F_{over} \cdot R_t / t / i / \eta / i_f \tag{65}$$

The control-amount calculating portion 2r receives the requested engine torque $T_{drv}$ from the requested-engine-torque calculating portion 2b, and also receives the over-torque $T_{over}$ from the over-torque calculating portion 2q. The control-amount calculating portion 2r calculates a first control amount (=a first torque-down amount) TTCS1 from the following expression (66) and outputs the calculated value to the control-amount setting unit 4.

$$TTCS1 = T_{drv} - T_{over} \tag{66}$$

Accordingly, in the first embodiment, the excessive-tire-force calculating portion 2p, the over-torque calculating portion 2q, and the control-amount calculating portion 2r constitute driving-force setting means that corrects a driving force requested by a driver.

A first control-amount setting program performed by the driving force control device 2 will now be described with reference to the flow charts shown in FIGS. 4 and 5.

In step S201, required parameters are read, which include a throttle opening $\theta_{th}$, an engine speed $N_e$, an accelerator opening $\theta_{ACC}$, a main transmission gear ratio i, a turbine speed $N_t$ of a torque converter, a tightening torque $T_{LSD}$ of a limited-slip differential clutch, a lateral acceleration $(d^2y/dt^2)$, a yaw rate $\gamma$, a steering-wheel angle $\theta_H$, wheel speeds $\omega_{fl}$, $\omega_{fr}$, $\omega_{rl}$, and $\omega_{rr}$ of the individual wheels, and a road-surface friction coefficient $\mu$.

In step S202, the engine-torque calculating portion 2a refers to a map (such as the map shown in FIG. 6) preliminarily set based on engine characteristics so as to determine an engine torque $T_{eg}$ currently being generated.

Figure 7:
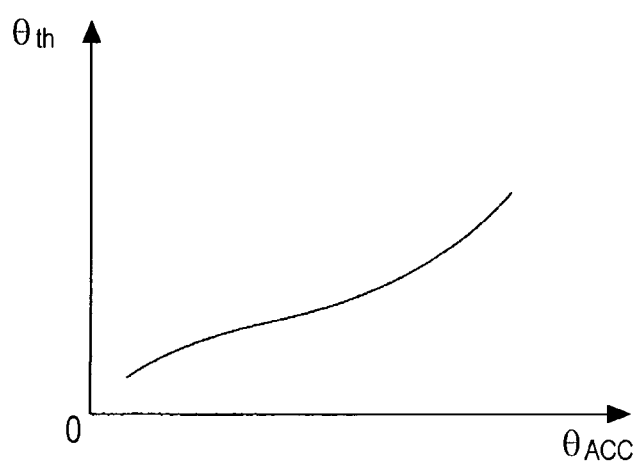
FIG. 7 illustrates an example of a relationship between an accelerator opening and a throttle opening for generating a requested engine torque.

In step S203, the requested-engine-torque calculating portion 2b determines a throttle opening $\theta_{th}$ from a preliminarily set map (such as the map in FIG. 7 showing a relationship between $\theta_{ACC}$ and $\theta_{th}$). Based on the throttle opening $\theta_{th}$, the requested-engine-torque calculating portion 2b determines an engine torque $T_{eg}$ as a requested engine torque $T_{drv}$ from the aforementioned map in FIG. 6.

In step S204, the transmission-output-torque calculating portion 2c calculates a transmission output torque $T_t$ from the aforementioned expression (1).

In step S205, the total-driving-force calculating portion 2d calculates a total driving force $F_x$ from the aforementioned expression (2).

In step S206, the front-rear ground-load calculating portion 2e calculates a front-wheel ground load $F_{zf}$ from the aforementioned expression (3) and a rear-wheel ground load $F_{zr}$ from the aforementioned expression (4).

In step S207, the left-wheel load-ratio calculating portion 2f calculates a left-wheel load-ratio WR_l from the aforementioned expression (5).

In step S208, the individual-wheel ground-load calculating portion 2g calculates a front-left-wheel ground load $F_{zf\_l}$, a front-right-wheel ground load $F_{zf\_r}$, a rear-left-wheel ground load $F_{zr\_l}$, and a rear-right-wheel ground load $F_{zr\_r}$ from the aforementioned expressions (6), (7), (8), and (9), respectively.

In step S209, the individual-wheel longitudinal-force calculating portion 2h calculates a front-left-wheel longitudinal force $F_{xf\_l}$, a front-right-wheel longitudinal force $F_{xf\_r}$, a rear-left-wheel longitudinal force $F_{xr\_l}$, and a rear-right-wheel longitudinal force $F_{xr\_r}$ from the aforementioned expressions (19) to (22), respectively. Subsequently, in step S210, the individual-wheel requested-lateral-force calculating portion 2i calculates a front-left-wheel requested lateral force $F_{yf\_l\_FF}$, a front-right-wheel requested lateral force $F_{yf\_r\_FF}$, a rear-left-wheel requested lateral force $F_{yr\_l\_FF}$, and a rear-right-wheel requested lateral force $F_{yr\_r\_FF}$ from the aforementioned expressions (25) to (28), respectively.

In step S211, the individual-wheel lateral-force calculating portion 2j calculates a front-left-wheel lateral force $F_{yf\_l\_FB}$, a front-right-wheel lateral force $F_{yf\_r\_FB}$, a rear-left-wheel lateral force $F_{yr\_l\_FB}$, and a rear-right-wheel lateral force $F_{yr\_r\_FB}$ from the aforementioned expressions (40) to (43), respectively.

In step S212, the individual-wheel friction-circle limit-value calculating portion 2k calculates a front-left-wheel friction-circle limit-value $\mu\_F_{zfl}$, a front-right-wheel friction-circle limit-value $\mu\_F_{zfr}$, a rear-left-wheel friction-circle limit-value $\mu\_F_{zrl}$, and a rear-right-wheel friction-circle limit-value $\mu\_F_{zrr}$ from the aforementioned expressions (44) to (47), respectively.

In step S213, the individual-wheel requested-resultant-tire-force calculating portion 2l calculates a front-left-wheel requested resultant tire force $F\_fl\_FF$, a front-right-wheel requested resultant tire force $F\_fr\_FF$, a rear-left-wheel requested resultant tire force $F\_rl\_FF$, and a rear-right-wheel requested resultant tire force $F\_rr\_FF$ from the aforementioned expressions (48) to (51), respectively.

In step S214, the individual-wheel resultant-tire-force calculating portion 2m calculates a front-left-wheel resultant tire force $F\_fl\_FB$, a front-right-wheel resultant tire force $F\_fr\_FB$, a rear-left-wheel resultant tire force $F\_rl\_FB$, and a rear-right-wheel resultant tire force $F\_rr\_FB$ from the aforementioned expressions (52) to (55), respectively.

In step S215, the individual-wheel requested-excessive-tire-force calculating portion 2n calculates a front-left-wheel requested excessive tire force $\Delta F\_fl\_FF$, a front-right-wheel requested excessive tire force $\Delta F\_fr\_FF$, a rear-left-wheel requested excessive tire force $\Delta F\_rl\_FF$, and a rear-right-wheel requested excessive tire force $\Delta F\_rr\_FF$ from the aforementioned expressions (56) to (59), respectively.

In step S216, the individual-wheel excessive-tire-force calculating portion 2o calculates a front-left-wheel excessive tire force $\Delta F\_fl\_FB$, a front-right-wheel resultant excessive tire force $\Delta F\_fr\_FB$, a rear-left-wheel resultant excessive tire force $\Delta F\_rl\_FB$, and a rear-right-wheel resultant excessive tire force $\Delta F\_rr\_FB$ from the aforementioned expressions (60) to (63), respectively.

In step S217, the excessive-tire-force calculating portion 2p calculates an excessive tire force $F_{over}$ from the aforementioned expression (64).

In step S218, the over-torque calculating portion 2q calculates an over-torque $T_{over}$ from the aforementioned expression (65). In step S119, the control-amount calculating portion 2r calculates a first control amount (=a first torque-down amount) TTCS1 from the aforementioned expression (66) and outputs the calculated value to the control amount setting unit 4. Finally, this exits the program.

According to the first embodiment of the present invention, in the first traction control unit 2, a torque value at which a tire force to be generated on each wheel based on a request from the driver exceeds the friction-circle limit value is compared with a torque value at which a tire force currently being generated on the wheel exceeds the friction-circle limit value, and the driving force is corrected by subtracting the larger one of the two values from a driving force requested by the driver. Consequently, an over-torque condition can be appropriately corrected not only for the present but also for the future, whereby appropriate control against spinning and plowing can be implemented. Thus, the grip forces of the tires can be appropriately maintained, whereby the driving stability of the vehicle can be improved.

Since the correction value to be subtracted from the driving force requested by the driver is simply a torque value at which a tire force exceeds the friction-circle limit value, a sudden reduction of the driving force in the longitudinal direction is prevented. This prevents the driver from feeling awkward or from having a sense of dissatisfaction due to a lack of acceleration (i.e. the driving force is inhibited only by an amount $F_{xa}$ in FIG. 12).

Figure 12:
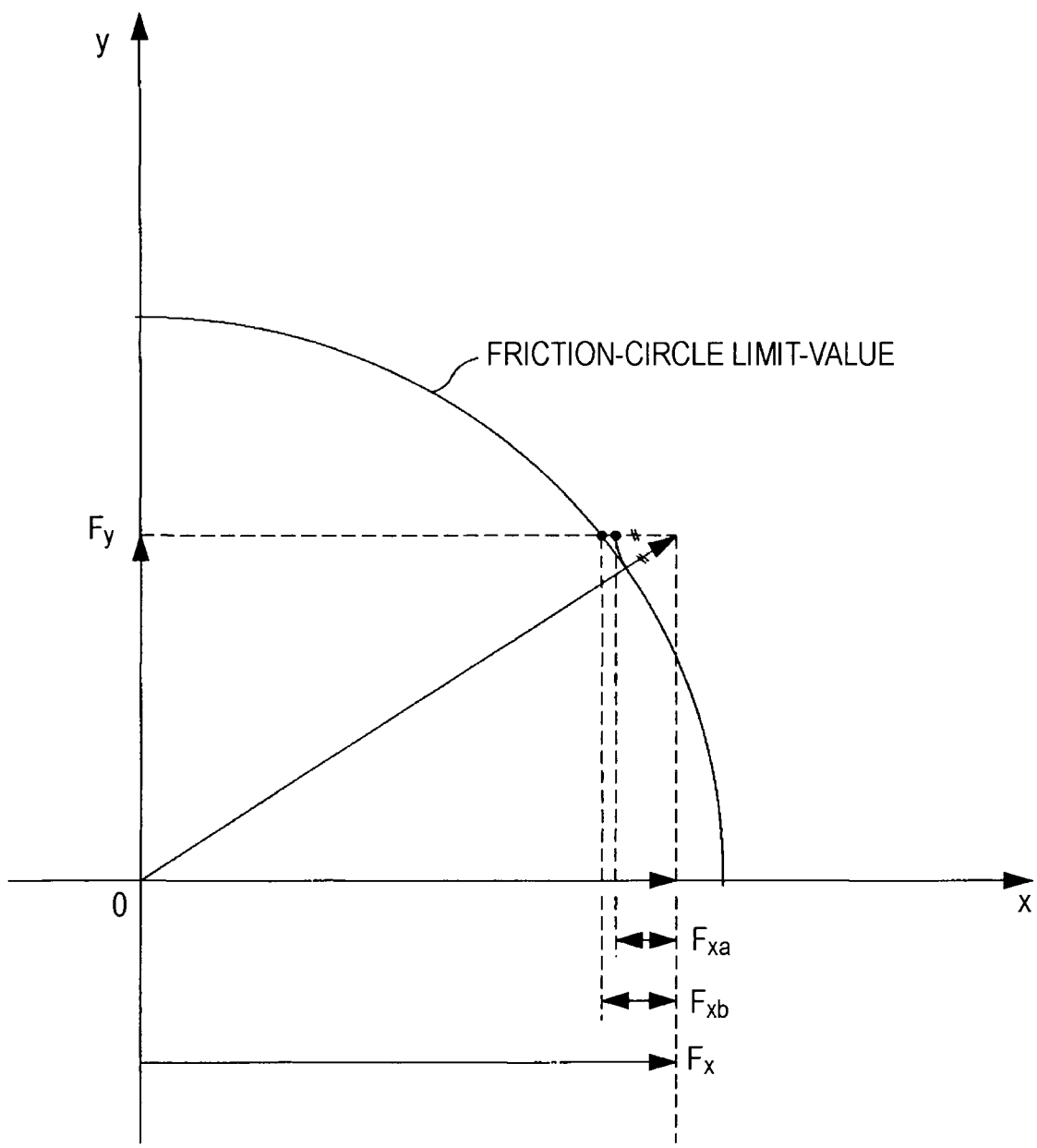
FIG. 12 illustrates an excessive tire force that is to be minimized.

Alternatively, the grip forces of the tires may be maintained by properly inhibiting the driving force in the longitudinal direction (namely, the driving force may be inhibited only by an amount $F_{xb}$ in FIG. 12). In that case, the control is realized by adding signal lines shown with dashed lines in FIG. 3, and by changing the calculations performed by the individual-wheel requested-excessive-tire-force calculating portion 2n and the individual-wheel excessive-tire-force calculating portion 2o in the following manner.

The individual-wheel requested-excessive-tire-force calculating portion 2n receives the front-left-wheel friction-circle limit-value $\mu\_F_{zfl}$, the front-right-wheel friction-circle limit-value $\mu\_F_{zfr}$, the rear-left-wheel friction-circle limit-value $\mu\_F_{zrl}$, and the rear-right-wheel friction-circle limit-value $\mu\_F_{zrr}$ from the individual-wheel friction-circle limit-value calculating portion 2k, receives the front-left-wheel requested lateral force $F_{yf\_l\_FF}$, the front-right-wheel requested lateral force $F_{yf\_r\_FF}$, the rear-left-wheel requested lateral force $F_{yr\_l\_FF}$, and the rear-right-wheel requested lateral force $F_{yr\_r\_FF}$ from the individual-wheel requested-lateral-force calculating portion 2i, and receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculating portion 2h.

The individual-wheel requested-excessive-tire-force calculating portion 2n calculates a front-left-wheel requested excessive tire force $\Delta F\_fl\_FF$, a front-right-wheel requested excessive tire force $\Delta F\_fr\_FF$, a rear-left-wheel requested excessive tire force $\Delta F\_rl\_FF$, and a rear-right-wheel requested excessive tire force $\Delta F\_rr\_FF$ from the following expressions (67) to (70), and outputs these calculated values to the excessive-tire-force calculating portion 2p.

$$\Delta F\_fl\_FF = F_{xf\_l} - (\mu\_F_{zfl}^2 - F_{yf\_l\_FF}^2)^{1/2} \qquad (67)$$

$$\Delta F\_fr\_FF = F_{xf\_r} - (\mu\_F_{zfr}^2 - F_{yf\_r\_FF}^2)^{1/2} \qquad (68)$$

$$\Delta F\_rl\_FF = F_{xr\_l} - (\mu\_F_{zrl}^2 - F_{yr\_l\_FF}^2)^{1/2} \qquad (69)$$

$$\Delta F\_rr\_FF = F_{xr\_r} - (\mu\_F_{zrr}^2 - F_{yr\_r\_FF}^2)^{1/2} \qquad (70)$$

The individual-wheel excessive-tire-force calculating portion 2o receives the front-left-wheel friction-circle limit-value $\mu\_F_{zfl}$, the front-right-wheel friction-circle limit-value $\mu\_F_{zfr}$, the rear-left-wheel friction-circle limit-value $\mu\_F_{zrl}$, and the rear-right-wheel friction-circle limit-value $\mu\_F_{zrr}$ from the individual-wheel friction-circle limit-value calculating portion 2k, receives the front-left-wheel lateral force $F_{yf\_l\_FB}$, the front-right-wheel lateral force $F_{yf\_r\_FB}$, the rear-left-wheel lateral force $F_{yr\_l\_FB}$, and the rear-right-wheel lateral force $F_{yr\_r\_FB}$ from the individual-wheel lateral-force calculating portion 2j, and receives the front-left-wheel longitudinal force $F_{xf\_l}$, the front-right-wheel longitudinal force $F_{xf\_r}$, the rear-left-wheel longitudinal force $F_{xr\_l}$, and the rear-right-wheel longitudinal force $F_{xr\_r}$ from the individual-wheel longitudinal-force calculating portion 2h.

The individual-wheel excessive-tire-force calculating portion 2o then calculates a front-left-wheel excessive tire force $\Delta F\_fl\_FB$, a front-right-wheel excessive tire force $\Delta F\_fr\_FB$, a rear-left-wheel excessive tire force $\Delta F\_rl\_FB$, and a rear-right-wheel excessive tire force $\Delta F\_rr\_FB$ from the following expressions (71) to (74), and outputs these calculated values to the excessive-tire-force calculating portion 2p.

$$\Delta F\_fl\_FB = F_{xf\_l} - (\mu\_F_{zfl}^2 - F_{yf\_l\_FB}^2)^{1/2} \qquad (71)$$

$$\Delta F\_fr\_FB = F_{xf\_r} - (\mu\_F_{zfr}^2 - F_{yf\_r\_FB}^2)^{1/2} \qquad (72)$$

$$\Delta F\_rl\_FB = F_{xr\_l} - (\mu\_F_{zrl}^2 - F_{yr\_l\_FB}^2)^{1/2} \qquad (73)$$

$$\Delta F\_rr\_FB = F_{xr\_r} - (\mu\_F_{zrr}^2 - F_{yr\_r\_FB}^2)^{1/2} \qquad (74)$$

On the other hand, referring to FIG. 1, the second traction control unit 3 is provided as second torque-down amount calculating means. The second traction control unit 3 is connected to the throttle-opening sensor 11, the engine-speed sensor 12, the transmission control unit 14, the lateral-acceleration sensor 15, the four wheel-speed sensors 18, and the longitudinal-acceleration sensor 19, and receives therefrom signals indicating a throttle opening $\theta_{th}$, an engine speed $N_e$, a main transmission gear ratio i, a lateral acceleration ($d^2y/dt^2$), wheel speeds $\omega_{fl}$, $\omega_{fr}$, $\omega_{rl}$, and $\omega_{rr}$ of the individual wheels, and a longitudinal acceleration ($d^2x/dt^2$).

Figure 13:
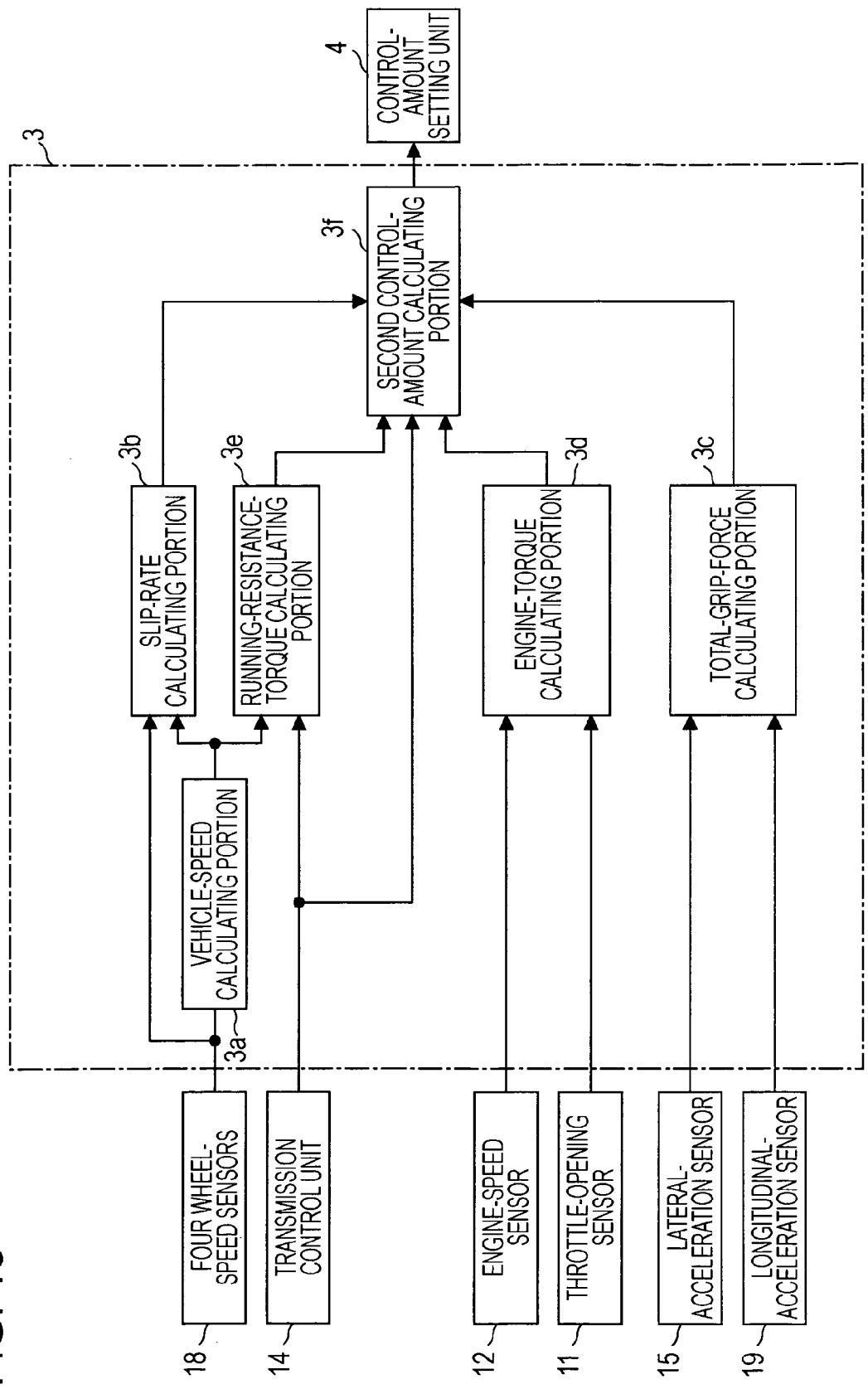
FIG. 13 is a functional block diagram of a second traction control unit.

Referring to FIG. 13, the second traction control unit 3 mainly includes a vehicle-speed calculating portion 3a, a slip-rate calculating portion 3b, a total-grip-force calculating portion 3c, an engine-torque calculating portion 3d, a running-resistance-torque calculating portion 3e, and a second control-amount calculating portion 3f.

The vehicle-speed calculating portion 3a receives the wheel speeds $\omega_{fl}$, $\omega_{fr}$, $\omega_{rl}$, and $\omega_{rr}$ of the four wheels from the four respective wheel-speed sensors 18 and calculates an average value of the wheel speeds so as to determine a vehicle speed V $(=(\omega_{fl}+\omega_{fr}+\omega_{rl}+\omega_{rr})/4)$. The vehicle-speed calculating portion 3a then outputs the vehicle speed V to the slip-rate calculating portion 3b and the running-resistance-torque calculating portion 3e.

The slip-rate calculating portion 3b receives the wheel speeds $\omega_{fl}$, $\omega_{fr}$, $\omega_{rl}$, and $\omega_{rr}$ of the four wheels from the four respective wheel-speed sensors 18, and also receives the vehicle speed V from the vehicle-speed calculating portion 3a. The slip-rate calculating portion 3b then calculates a slip rate of each of the wheels from the following expression (75), and outputs the highest slip rate value as a slip rate λ to the second control-amount calculating portion 3f.

$$\lambda = (\omega - V)/\omega \cdot 100 \tag{75}$$

In this case, ω represents $\omega_{fl}$ to $\omega_{rr}$.

The total-grip-force calculating portion 3c receives the lateral acceleration $(d^2y/dt^2)$ from the lateral-acceleration sensor 15, and also receives the longitudinal acceleration $(d^2x/dt^2)$ from the longitudinal-acceleration sensor 19. The total-grip-force calculating portion 3c then calculates a total grip force TG corresponding to the acceleration of the vehicle body from, for example, the following expression (76), and outputs the calculated value to the second control-amount calculating portion 3f.

$$TG = (K1 \cdot (d^2x/dt^2))^2 + (K2 \cdot (d^2y/dt^2))^2)^{1/2} \tag{76}$$

In this case, K1 and K2 indicate correction coefficients.

Similar to the engine-torque calculating portion 2a in the first traction control unit 2, the engine-torque calculating portion 3d receives the throttle opening $\theta_{th}$ from the throttle-opening sensor 11 and the engine speed $N_e$ from the engine-speed sensor 12. The engine-torque calculating portion 3d refers to a map (such as the map shown in FIG. 6) preliminarily set based on engine characteristics so as to determine an engine torque $T_{eg}$ currently being generated. The engine-torque calculating portion 3d then outputs the determined engine torque $T_{eg}$ to the second control-amount calculating portion 3f. The engine torque $T_{eg}$ may alternatively be read from the engine control unit 5.

The running-resistance-torque calculating portion 3e receives the main transmission gear ratio i from the transmission control unit 14 and the vehicle speed V from the vehicle-speed calculating portion 3a. The running-resistance-torque calculating portion 3e then calculates a running resistance $T_p$ consisting of a rolling resistance of the tires and an air resistance of the vehicle body using, for example, the following expression (77), and outputs the calculated value to the second control-amount calculating portion 3f.

$$T_p = (K3 + K4 \cdot V^2) \cdot i \tag{77}$$

In this case, K3 and K4 indicate correction coefficients.

The second control-amount calculating portion 3f receives the main transmission gear ratio i from the transmission control unit 14, the slip rate λ from the slip-rate calculating portion 3b, the total grip force TG from the total-grip-force calculating portion 3c, the engine torque $T_{eg}$ from the engine-torque calculating portion 3d, and the running resistance $T_p$ from the running-resistance-torque calculating portion 3e. Then, the second control-amount calculating portion 3f calculates a second control amount $T_{TCS2}$ used for when reducing the engine output torque, and outputs the calculated value to the control-amount setting unit 4.

In detail, based on the following expression (78), a value given filtering of a first-order time lag with respect to the engine torque $T_{eg}$ is calculated as a first initially required engine torque $T_{EF}$.

$$T_{EF} = (1-K) \cdot T_{EF}(k-1) + K \cdot T_{eg}(k) \tag{78}$$

Furthermore, a basic initially required torque $T_{ii}$ is retrieved from a preliminarily set map on the basis of the main transmission gear ratio i and the total grip force TG. The basic initially required torque $T_{ii}$ and the running resistance $T_p$ are added together so as to determine a second initially required engine torque $T_{ED}$.

$$T_{ED} = T_{ii} + T_p \tag{79}$$

A second initially required engine torque $T_{ED}$ is a sum of the basic initially required torque $T_{ii}$, which is a torque transmitted to the road surface without being consumed by excessive slipping of the drive wheels, and the running resistance $T_p$ consisting of a rolling resistance of the tires and an air resistance of the vehicle body. Therefore, a second initially required engine torque $T_{ED}$ corresponds to a value obtained by subtracting an ineffective torque consumed by excessive slipping of the drive wheels from the current engine torque $T_{eg}$.

As will be mentioned in a second control amount calculation program to be described hereinafter, when the slip rate λ exceeds predetermined threshold values $L_{C1}$ and $L_{C2}$, either the first initially required engine torque $T_{EF}$ or the second initially required engine torque $T_{ED}$ is selected and set as a second control amount (=a second torque-down amount) $T_{TCS2}$, and is output to the control-amount setting unit 4. On the other hand, if the slip rate λ does not exceed the predetermined threshold values $L_{C1}$ and $L_{C2}$, the second control amount $T_{TCS2}$ is set to the current engine torque $T_{eg}$ since torque-down in this case is not implemented.

Figure 14:
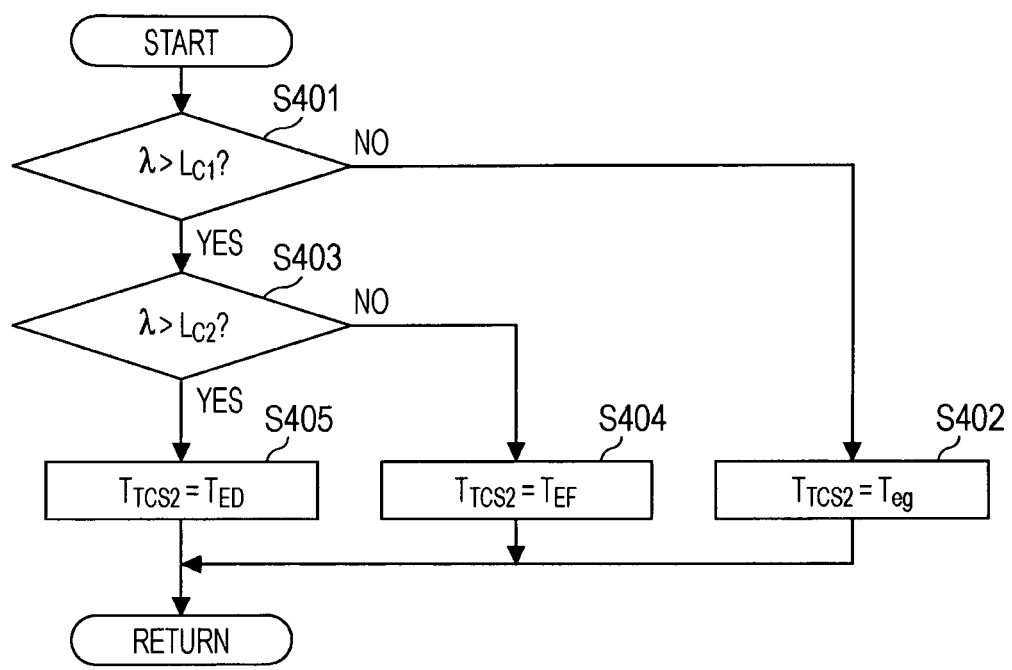
FIG. 14 is a flow chart of a second control amount calculation program.

Specifically, the flow chart shown in FIG. 14 illustrates a second control amount calculation program. In step S401, if the slip rate λ is less than or equal to the first threshold value $L_{C1}$, namely, while the slip rate λ is extremely small and the engine output torque is sufficiently transmitted to the road surface, the operation proceeds to step S402 where the second control amount $T_{TCS2}$ remains to be set at the current engine torque $T_{eg}$ and torque-down control is not implemented.

On the other hand, if the slip rate λ exceeds the first threshold value $L_{C1}$ in step S401 and if the slip rate λ is less than or equal to the second threshold value $L_{C2}$, which is greater than the first threshold value $L_{C1}$, in step S403, namely, in a range where the slip rate λ is relatively small, the operation proceeds to step S404 where a first initially required engine torque $T_{EF}$ determined by filtering the engine torque $T_{eg}$ is set as the second control amount $T_{TCS2}$. By setting the first initially required engine torque $T_{EF}$ and starting feedback control in this manner, a sudden change in the engine torque $T_{eg}$ can be prevented, thereby avoiding an adverse effect on the vehicle behavior. In addition, by using a first initially required engine torque $T_{EF}$ determined by filtering the engine torque $T_{eg}$, a time lag that occurs until the engine torque $T_{eg}$ converges to a desired value can be compensated for, thereby achieving enhanced feedback properties.

In step S403, if the slip rate λ exceeds the second threshold value $L_{C2}$, namely, when the slip rate λ is large, the operation proceeds to step S405 where a second initially required engine torque $T_{ED}$, which is a sum of the basic initially required torque $T_{ii}$ and the running resistance $T_p$, is set as the second control amount $T_{TCS2}$. As a result, feedback control starts from a maximum initial torque at which the vehicle can possibly be accelerated without an occurrence of excessive slipping of the drive wheels. Consequently, excessive slipping can be made to quickly converge without having a significant effect on the vehicle behavior.

Referring to FIG. 1, the control-amount setting unit 4 is provided as driving-force setting means, and receives the first control amount (=the first torque-down amount) $T_{TCS1}$ from the first traction control unit 2 and the second control amount (=the second torque-down amount) $T_{TCS2}$ from the second traction control unit 3. The control-amount setting unit 4 then compares the first control amount $T_{TCS1}$ with the second control amount $T_{TCS2}$ and sets the smaller value (i.e. the value with a larger torque-down amount) as a control amount (=torque-down amount) $T_{TCS}$ to be used by the driving force control device 1. Subsequently, the control-amount setting unit 4 outputs the control amount $T_{TCS}$ to the engine control unit 5. Upon receiving a signal indicating the control amount $T_{TCS}$ from the driving force control device 1, the engine control unit 5 performs control so as to limit the driving force to an amount less than or equal to the control amount $T_{TCS}$.

Figure 2:
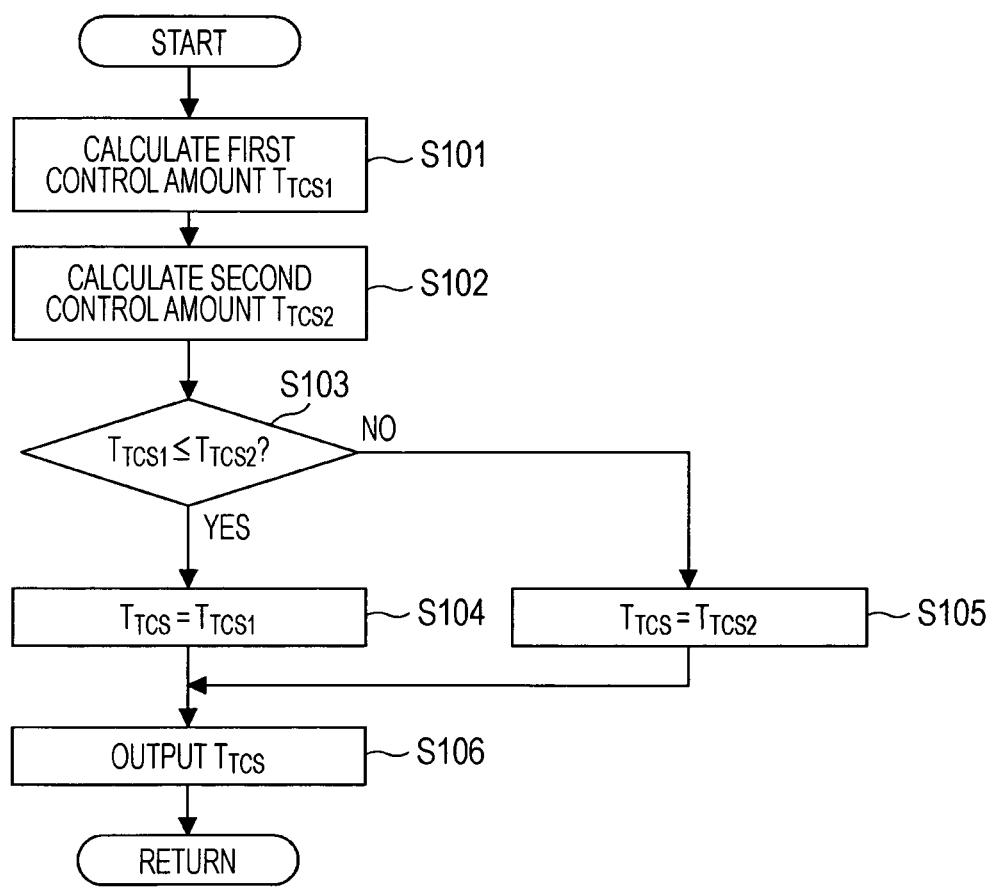
FIG. 2 is a flow chart of a driving force control program.

Specifically, referring to FIG. 2, the driving force control device 1 performs a driving force control program. In step S101, the first traction control unit 2 calculates a first control amount $T_{TCS1}$. In step S102, the second traction control unit 3 calculates a second control amount $T_{TCS2}$.

In step S103, the first control amount $T_{TCS1}$ and the second control amount $T_{TCS2}$ are compared. If the first control amount $T_{TCS1}$ is less than or equal to the second control amount $T_{TCS2}$, the operation proceeds to step S104 where the first control amount $T_{TCS1}$ is set as the control amount $T_{TCS}$. In contrast, if the first control amount $T_{TCS1}$ is greater than the second control amount $T_{TCS2}$, the operation proceeds to step S105 where the second control amount $T_{TCS2}$ is set as the control amount $T_{TCS}$.

Subsequently, in step S106, the control amount $T_{TCS}$ set in step S104 or S105 is output to the engine control unit 5. Finally, this exits the program.

According to this embodiment, the first traction control unit 2 is provided, which is configured to estimate a tire force generated on a tire and to estimate a friction-circle limit as a maximum tire force which the tire is capable of exercising against a current road-surface and to calculate a first torque-down amount on the basis of a relation between the tire force and the friction-circle limit-value, and the second traction control unit 3 is provided, which is configured to calculate a slip rate of the tire and calculate a second torque-down amount on the basis of at least the slip rate. The control-amount setting unit 4 compares the first torque-down amount $T_{TCS1}$ with the second torque-down amount $T_{TCS2}$ and sets the smaller value (i.e. the value with a larger torque-down amount) as a control amount $T_{TCS}$ to be used by the driving force control device 1. The control-amount setting unit 4 then outputs the control amount $T_{TCS}$ to the engine control unit 5.

Accordingly, in a running condition where it is difficult to estimate a friction coefficient μ between the tires and the road surface, such as when the vehicle is in a straight running mode or a starting mode, or in a running condition where the grip forces of the tires in the lateral direction are not very necessary in view of the safety of the vehicle, the grip forces of the tires in the driving direction can be sufficiently used up by means of the second traction control unit 3 that detects the slip rate of the tires and limits the driving torque. On the other hand, in a running condition where the friction coefficient μ between the tires and the road surface can be estimated with high precision, such as when the vehicle is in a cornering mode, the slipping of the tires can be prevented from occurring by feed forward control of the driving torque performed by the first traction control unit 2. Thus, the grip forces of the tires in the lateral direction can be maintained at a high level, thereby enhancing the stability of the vehicle. For example, when the vehicle switches from a cornering mode to a straight running mode or a starting mode, or vice versa, the larger torque-down amount is set as a control amount. Thus, the vehicle can smoothly switch modes without a sudden change in the control amount, thereby achieving control that gives a natural operational feel to the driver.

What is claimed is:

1. A vehicle driving force control device comprising:
   friction-circle limit-value estimating means configured to estimate a friction-circle limit-value as a maximum tire force which the tire is capable of exercising against a current road-surface based on an estimated tire force generated on a tire;
   slip rate calculating means configured to calculate a slip rate of the tire;
   first torque-down amount calculating means configured to calculate a first torque-down amount, as a first torque reduction amount in a state in which the tire is prevented from slipping, on the basis of a relation between the tire force and the friction-circle limit-value;
   second torque-down amount calculating means configured to calculate a second torque-down amount, as a second torque reduction amount in a state in which the tire is slipping, on the basis of at least the slip rate; and
   driving-force setting means configured to set a driving force of the vehicle by reducing a current torque in accordance with one of the first torque-down amount and the second torque-down amount.

2. The vehicle driving force control device according to claim 1, further comprising:
   road-surface friction coefficient estimating means configured to estimate a road-surface friction coefficient of the current road surface;
   ground-load estimating means configured to estimate a ground-load acting on the tire; wherein the friction-circle limit-value estimating means estimates the friction-circle limit-value on the basis of the road-surface friction coefficient and the ground-load.

3. The vehicle driving force control device according to claim 1, wherein a tire force estimating means estimates either or both of a first tire force output from an engine to the tire and a second tire force currently generated between the tire and the road-surface as the tire force.

4. The vehicle driving force control device according to claim 2, wherein a tire force estimating means estimates either or both of a first tire force output from an engine to the tire and a second tire force currently generated between the tire and the road-surface as the tire force.

5. A vehicle driving force control device comprising:
   tire force estimating means configured to estimate a tire force generated on a tire;
   friction-circle limit-value estimating means configured to estimate a friction-circle limit-value as a maximum tire force which the tire is capable of exercising against a current road-surface based on an estimated tire force generated on a tire;
   slip rate calculating means configured to calculate a slip rate of the tire;
   first torque-down amount calculating means configured to calculate a first torque-down amount, as a first torque reduction amount in a state in which the tire is prevented from slipping, on the basis of a relation between the tire force and the friction-circle limit-value;

second torque-down amount calculating means configured to calculate a second torque-down amount, as a second torque reduction amount in a state in which the tire is slipping, on the basis of at least the slip rate; and driving-force setting means configured to set a driving force of the vehicle by reducing a current toque in accordance with one of the first torque-down amount and the second torque-down amount;

wherein the tire force estimating means estimates either or both of a first tire force output from an engine to the tire and a second tire force currently generated between the tire and the road-surface as the tire force, and wherein the first torque-down amount calculating means is configured to calculate a first torque-down amount based on:
- a first excessive tire force estimating portion configured to estimate a tire force exceeding the friction-circle limit value on the basis of the first tire force and the friction-circle limit value as a first excessive tire force;
- a second excessive tire force estimating portion configured to estimate a tire force exceeding the friction-circle limit value on the basis of the second tire force and the friction-circle limit value as a second excessive tire force; and
- a first torque-down amount setting portion configured to set the first torque-down amount on the basis of the first excessive tire force and the second excessive tire force.

6. The vehicle driving force control device according to claim 4,
wherein the first torque-down amount calculating means is configured to calculate a first torque-down amount based on:
- a first excessive tire force estimating portion configured to estimate a tire force exceeding the friction-circle limit value on the basis of the first tire force and the friction-circle limit value as a first excessive tire force;
- a second excessive tire force estimating portion configured to estimate a tire force exceeding the friction-circle limit value on the basis of the second tire force and the friction-circle limit value as a second excessive tire force; and
- a first torque-down amount setting portion configured to set the first torque-down amount on the basis of the first excessive tire force and the second excessive tire force.

7. The vehicle driving force control device according to claim 5, wherein the first torque-down amount setting portion sets the first torque-down amount on the basis of the larger one of the first and second excessive-tire forces.

8. The vehicle driving force control device according to claim 6, wherein the first torque-down amount setting portion sets the first torque-down amount on the basis of the larger one of the first and second excessive-tire forces.

9. The vehicle driving force control device according to claim 1, wherein the driving-force setting means compares the first torque-down amount with the second torque-down amount and limits the driving force by reducing a current torque by the greater of the two torque-down amounts.

10. The vehicle driving force control device according to claim 2, wherein the driving-force setting means compares the first torque-down amount with the second torque-down amount and limits the driving force by reducing a current torque by the greater of the two torque-down amounts.

11. The vehicle driving force control device according to claim 3, wherein the driving-force setting means compares the first torque-down amount with the second torque-down amount and limits the driving force by reducing a current torque by the greater of the two torque-down amounts.

12. The vehicle driving force control device according to claim 4, wherein the driving-force setting means compares the first torque-down amount with the second torque-down amount and limits the driving force by reducing a current torque by the greater of the two torque-down amounts.

13. The vehicle driving force control device according to claim 5, wherein the driving-force setting means compares the first torque-down amount with the second torque-down amount and limits the driving force by reducing a current torque by the greater of the two torque-down amounts.

14. The vehicle driving force control device according to claim 6, wherein the driving-force setting means compares the first torque-down amount with the second torque-down amount and limits the driving force by reducing a current torque by the greater of the two torque-down amounts.

15. The vehicle driving force control device according to claim 7, wherein the driving-force setting means compares the first torque-down amount with the second torque-down amount and limits the driving force by reducing a current torque by the greater of the two torque-down amounts.

16. The vehicle driving force control device according to claim 8, wherein the driving-force setting means compares the first torque-down amount with the second torque-down amount and limits the driving force by reducing a current torque by the greater of the two torque-down amounts.

17. A vehicle driving force control device comprising:
- a first traction control unit configured to calculate a first torque control amount, as a first reduced torque amount in a state in which the tire is prevented from slipping, on the basis of at least a relation between a tire force and a friction-circle limit-value, said first traction control unit comprising,
  - a friction-circle limit-value estimating unit configured to estimate a friction-circle limit-value as a maximum tire force which the tire is capable of exercising against a current road-surface based on an estimated tire force generated on a tire;
- a second traction control unit configured to calculate a second torque control amount, as a second reduced torque amount in a state in which the tire is slipping, on the basis of at least a slip rate, said second traction control unit comprising,
  - a slip rate calculating unit configured to calculate a slip rate of the tire; and
- a driving-force setting unit configured to set a driving force for the vehicle by reducing a current torque amount to one of the first torque control amount and the second torque control amount.

18. The vehicle driving force control device according to claim 17, wherein said first traction control unit further comprises an excessive-tire-force calculating portion which sets as an excessive-tire-force amount the larger of a torque value at which a tire-force is requested to be generated, and a torque value at which a tire-force is currently being generated.

19. The vehicle driving force control device according to claim 18, wherein said first traction control unit further comprises an over-torque calculating portion which outputs an over-torque correction value based on the excessive-tire-force amount set by said excessive-tire-force calculating portion.

20. The vehicle driving force control device according to claim 17, wherein, said second traction control unit is configured to set the second torque control amount to be equal to the current engine torque when said slip rate calculating unit calculates the slip rate to be at a value below a predetermined threshold value.

21. The vehicle driving force control device according to claim 1, wherein
the friction-circle limit-value estimating means is configured to receive a road-surface friction coefficient value from a road surface estimation unit, and wherein
the friction-circle limit-value estimating means is configured to calculate a friction-circle limit-value and output the calculated friction-circle limit-value for use in setting the driving force determined by said driving-force setting means.

22. The vehicle driving force control device according to claim 21 wherein the friction-circle limit-value estimating means estimates a friction-circle limit-value as a maximum tire force which the tire is capable of exercising against a current road-surface through the combined use of at least the road-surface friction coefficient value and a vertical axis wheel ground load input.

* * * * *